(12) United States Patent
Mitchell

(10) Patent No.: US 11,847,747 B2
(45) Date of Patent: *Dec. 19, 2023

(54) DISPLAYING A VIRTUAL IMAGE OF A BUILDING INFORMATION MODEL

(71) Applicant: XYZ REALITY LIMITED, London (GB)

(72) Inventor: David John Mitchell, Greater London (GB)

(73) Assignee: XYZ REALITY LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,112

(22) Filed: Jun. 7, 2022

(65) Prior Publication Data
US 2022/0301265 A1    Sep. 22, 2022

Related U.S. Application Data

(63) Continuation of application No. 17/475,992, filed on Sep. 15, 2021, now Pat. No. 11,694,406, which is a
(Continued)

(30) Foreign Application Priority Data

Sep. 6, 2017   (GB) ...................................... 1714349

(51) Int. Cl.
*G06T 15/00* (2011.01)
*G06T 19/00* (2011.01)
(Continued)

(52) U.S. Cl.
CPC ........ *G06T 19/003* (2013.01); *G02B 27/0093* (2013.01); *G02B 27/0172* (2013.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 5,100,229 A | 3/1992 | Lundberg et al. |
| 6,094,625 A | 7/2000 | Ralston |

(Continued)

FOREIGN PATENT DOCUMENTS

| EP | 1980999 A1 | 10/2008 |
| WO | 0165207 A2 | 9/2001 |

(Continued)

OTHER PUBLICATIONS

Behzadan, A. H., et al., "Ubiquitous location tracking for context-specific information delivery on construction sites," Automation in Construction, https://doi.org/10.1016/j.autcon.2008.02.002, vol. 17, Issue 6, Aug. 2008, pp. 737-748.

(Continued)

*Primary Examiner* — Gordon G Liu
(74) *Attorney, Agent, or Firm* — Rothwell, Figg, Ernst & Manbeck, P.C.

(57) ABSTRACT

A headset for use in displaying a virtual image of a building information model (BIM) in relation to a site coordinate system of a construction site. The headset comprises an article of headwear having one or more position-tracking sensors mounted thereon, augmented reality glasses incorporating at least one display, a display position tracking device for tracking movement of the display relative to at least one of the user's eyes and an electronic control system. The electronic control system is configured to convert a BIM model defined in an extrinsic, real world coordinate system into an intrinsic coordinate system defined by a position tracking system, receive display position data from the
(Continued)

display position device and headset tracking data from a headset tracking system and render a virtual image of the BIM relative to the position and orientation of the article of headwear on the construction site and relative position of the display relative to the user's eye and transmit the rendered virtual image to the display which is viewable by the user as a virtual image of the BIM.

33 Claims, 20 Drawing Sheets

Related U.S. Application Data continuation of application No. 16/645,276, filed as application No. PCT/GB2018/052529 on Sep. 6, 2018, now Pat. No. 11,158,127.

(51) Int. Cl.
G06T 7/73 (2017.01)
H04W 4/029 (2018.01)
G02B 27/00 (2006.01)
G02B 27/01 (2006.01)

(52) U.S. Cl.
CPC ............ *G02B 27/0179* (2013.01); *G06T 7/74* (2017.01); *G06T 19/006* (2013.01); *H04W 4/029* (2018.02); *G02B 2027/0178* (2013.01); *G02B 2027/0187* (2013.01)

(58) Field of Classification Search
USPC ....................................................... 345/419
See application file for complete search history.

(56) References Cited

U.S. PATENT DOCUMENTS

| | | | |
|---|---|---|---|
| 7,592,911 B1 | 9/2009 | Hudgens et al. | |
| 9,665,985 B2 | 5/2017 | Mullins et al. | |
| 9,754,415 B2 | 9/2017 | Fleck et al. | |
| 2013/0155058 A1* | 6/2013 | Golparvar-Fard | G06Q 10/06311 345/419 |
| 2013/0235169 A1 | 9/2013 | Kato et al. | |
| 2015/0109509 A1* | 4/2015 | Di Federico | H04N 23/6812 348/333.02 |
| 2015/0235474 A1 | 8/2015 | Mullins | |
| 2015/0317418 A1 | 11/2015 | Sankarapandian | |
| 2016/0049004 A1 | 2/2016 | Mullins et al. | |
| 2016/0292918 A1* | 10/2016 | Cummings | H04N 23/698 |
| 2017/0061605 A1 | 3/2017 | Nagashima et al. | |
| 2017/0090203 A1 | 3/2017 | Mullins et al. | |
| 2017/0169612 A1 | 6/2017 | Cashen et al. | |
| 2018/0003805 A1 | 1/2018 | Popovich | |
| 2018/0128897 A1 | 5/2018 | Labrecque | |
| 2019/0385370 A1 | 12/2019 | Boyapalle et al. | |

FOREIGN PATENT DOCUMENTS

| | | |
|---|---|---|
| WO | 0204891 A1 | 1/2002 |
| WO | 2015102834 A1 | 7/2015 |
| WO | 2016077401 A1 | 5/2016 |

OTHER PUBLICATIONS

Wang, X., et al., "Integrating Augmented Reality with Building Information Modeling: Onsite construction process controlling for liquefied natural gas industry," Automation in Construction, https://doi.org/10.1016/j.autcon.2013.12.003, vol. 40, Apr. 1, 2014, pp. 96-105 (8 pages).

International Preliminary Report on Patentability for PCT/GB2018/052529 dated Jan. 7, 2020, 14 pages.

International Search Report and Written Opinion for PCT/GB2018/052529 dated Dec. 13, 2018, 24 pages.

Search Report for GB1714349.6 dated Feb. 15, 2018, 5 pages.

Jun. 6, 2017 entry on the Wayback Machine for https://daqri.com/products/smart-helmet/.

* cited by examiner

DISPLAYING A VIRTUAL IMAGE OF A BUILDING INFORMATION MODEL

CROSS REFERENCE TO RELATED APPLICATION(S)

This application is a continuation of U.S. application Ser. No. 17/475,992 filed on Sep. 15, 2021, which is a continuation of U.S. application Ser. No. 16/645,276 filed on Mar. 6, 2020 (now U.S. patent Ser. No. 11/158,127), which is a 35 U.S.C. § 371 National Stage of International Patent Application No. PCT/GB2018/052529, filed Sep. 6, 2018, designating the United States, which claims the benefit of priority based on Great Britain Application No. 1714349.6, filed Sep. 6, 2017, the disclosures of which are incorporated herein by reference in their entirety.

TECHNICAL FIELD

The present invention relates to displaying a virtual image of a building information model (BIM). In particular, but not exclusively, the present invention relates to using an augmented reality display device to display a virtual image of a task to be performed or object to be constructed in its correct position and orientation on a construction site with sufficient accuracy that it can be used as an alternative to conventional setting out the construction site; for instance by determining where a given construction task should be carried out. Embodiments of the invention may use a positional tracking system (such as an optical "inside out" positional tracking system) to locate an augmented reality head mounted display (HMD) with an accuracy of at least about 5 mm. The present invention provides equipment for relating real world set out data to tracking data received from a tracking system, computer software for calibrating and controlling the operation of such equipment, as well as an augmented reality HMD for displaying a virtual model in real world coordinates. The present invention aims to enable builders and others to use an augmented reality HMD to start, complete and validate their construction tasks to within 3 mm accuracy/construction tolerances, without the need to rely on a set out and/or validation engineer.

BACKGROUND OF THE INVENTION

Erecting a structure or constructing a building on a construction site is a lengthy process. The process can be summarised as follows: First, a three-dimensional model, known as a Building Information Model (BIM), is produced by a designer or architect. The BIM model is typically defined in real world coordinates. The BIM model is then sent to a construction site, most commonly in the form of 2-dimensional drawings or, in some cases, as a 3D model on a computing device. An engineer, using a conventional stake out/set out device, establishes control points at known locations in the real world coordinates on the site and uses the control points as a reference to mark out the location where each structure in the 2D drawings or BIM model is to be constructed. A builder then uses the drawings and/or BIM model in conjunction with the marks ("Set Out marks") made by the engineer to erect the structure according to the drawings or model in the correct place. Finally, an engineer must validate the structure or task carried out. This can done using a 3D laser scanner to capture a point-cloud from which a 3D model of the "as built" structure can be derived automatically. The "as built" model is then compared to the original BIM model. This process can take up to two weeks, after which any items that are found to be out of tolerance must be reviewed and may give rise to a penalty or must be re-done.

Conventionally, a construction site is set out by an experienced site engineer using a total station or TST (total station theodolite) for positioning the control points at the construction site in relation to points of known location at or near the construction site, for example, as benchmarks. The real world positions of such points of known location may be known from their Ordnance Survey or WGS 84 references, for example. Any natural or man-made geographical feature may be used for locating the control points, provided its position is accurately known. The control points can then be positioned at the construction site using a total station by triangulation from two or more points of known location.

Each task to be carried out at a construction site must be accurately set out in this way. Typically, setting out must be done several times during a project as successive phases of the work may erase temporary markers.

Further, once a task has been completed at a construction site, it is generally necessary to validate the task/check it has been done at the correct location and, to this end, the site engineer must check the location where the task has been carried out by reference to the control points using a theodolite.

Each time setting-out is required during a construction project, a delay is introduced while waiting for the site engineer to attend the construction site. It would be desirable to be able to start erecting a structure without having to rely on a site engineer each time it is needed to locate the position of a construction task to be carried out.

Another disadvantage of known methods of setting out a construction site is that even though reference points and markers are established at suitable positions to enable the work crew to carry out a task at its correct location according to construction drawings, it is still necessary for the crew to interpret the construction drawings to determine the details of the task to be carried out and to interpolate between reference points or markings. In practice, this frequently leads to discrepancies between the construction drawings and the task as carried out.

Yet another disadvantage of known methods is that reference points and markings are often positioned at a construction site in relation to control points or other reference points that have themselves been located in relation to points of known location. Each time a new reference point or marking is positioned relative to an earlier reference point or construction point, positioning errors are magnified.

Yet another disadvantage of known methods is that today's theodolites used for validation can take up to two weeks to provide contractors with validation information.

These disadvantages can have significant knock on effects. If a set out is completed incorrectly, or if a structure is erected incorrectly based on an incorrect interpretation of set out marks, the next trade contractor will build on top of the mistake, thus compounding the errors. Given a typical 1-2 week validation lead time, several contractors could compound errors in a project. This often results in the contractors delivering projects that are neither on time, within budget nor to the correct specification.

In many countries, a construction worker is required to wear a construction helmet (or hard hat) to protect his or her head from injury owing to falling objects, impact with other objects, debris, rain and electric shock while working on a construction site. In the United Kingdom, for example, the Personal Protective Equipment (PPE) Regulations 1992 specify that hard hats are a component of PPE and, by law, all those working on construction sites or within hazardous environments are required to wear a hard hat.

Hard hats are generally made to applicable safety standards. In 1997, the American National Standards Institute revised performance Z89.1 standard for hard hats that has been harmonised with CSA Z94.1 standard. Conformity with these standards is not mandatory, but most manufacturers comply.

The design and construction of hard hats are well known to those skilled in the art and need not be described in detail herein. Suspension bands inside the hard hat spread the hard hat's weight and the force of any impact over the top of the head; the hard hat may be fitted with a visor, an extra-wide brim attachment for additional shade, ear protectors, mirrors for increased rear field-of-view, a mounting for a headlamp or flashlight, a chinstrap to keep the helmet from falling off if the wearer leans over, insulating side pads to keep sides of the head warm and/or bands stretched around the brim for colour worker identification and/or high visibility night retro-reflectivity.

Given the ubiquity of hard hats on a construction site, it is unsurprising that they have been used in the art to carry electronic equipment for performing or assisting with operations to be carried out at a construction site.

For instance, U.S. Pat. No. 7,592,911 B1 (Hudgens et al.) discloses tracking personnel activity at a construction site using electronic circuitry included in hard hats worn by personnel at the site. According to one embodiment of U.S. Pat. No. 7,592,911 B1, activity at a construction site is monitored by processing personal information directly or indirectly received from electronic circuitry formed as part of one or more hard hats worn by personnel located at the construction site. The personal information is uniquely associated with individual ones of the personnel. One or more messages are generated based on the personal information received from the electronic circuitry and personnel location. For example, the messages may warn particular personnel they have entered an unauthorised area at the construction site. Optionally, personnel activity may be periodically monitored and reported.

A 'smart helmet' available from Daqri, LLC of Los Angeles, CA, incorporates an augmented reality display in a hard hat for displaying augmented reality and/or multimedia information to an industrial worker, including visual instructions, real time alerts and 3D mapping (see, e.g., http://web.archive.org/web/20170606162951/https://daqri.com/products/smart-helmet/).

Augmented reality (AR) is a live, direct or indirect, view of a physical, real-world environment whose elements are augmented by computer-generated sensory input such as sound, video, graphics or GPS data. AR applications allow a user to experience information, such as in the form of a three-dimensional virtual object overlaid on an image of a physical object captured by a camera of a viewing device. The virtual object is displayed to the user as if projected by "virtual cameras" aligned with the user's eyes. Other augmented reality applications allow a user to experience visualisation of additional information overlaid on top of a view or an image of any object in the real physical world.

WO 2015/102834 A1 (Daqri, LLC) discloses a system and method for offloading augmented reality processing. A sensor external to a viewing device of a user tracks the location and an orientation of the viewing device. The viewing device may be a computing device with a display, such as a smartphone, a tablet computer or a wearable computing device (e.g. a watch or glasses). The computing device may be hand-held or may be removably mounted to a head of the user. The location and orientation are defined relative to predefined references of the physical environment local to the user. A server receives a request from the viewing device to offload at least one of a tracking process and an augmented reality rendering process. The augmented reality rendering process is based on an augmented reality database. The server generates offloaded processed data based on the request and the location and orientation of the viewing device. The offloaded processed data is streamed to the viewing device. A visualisation of the offloaded processed data is generated in the viewing device.

According to US 2015/0235474 A1 (Mullins), a survey application generates a survey of components associated with a three-dimensional model of an object. The survey application receives video feeds, location information and orientation information from wearable devices in proximity to the object. The three-dimensional model of the object is generated based on the video feeds, sensor data, location information and orientation information received from the wearable devices. Analytics is performed from the video feeds to identify a manipulation on the object. The three-dimensional model of the object is updated based on the manipulation of the object. A dynamic status related to the manipulation on the object is generated with respect to reference data related to the object.

Multiple wearable devices (e.g. mobile devices that include a camera and a display) looking at a same physical object from different angles and locations may be further used to generate and reconstruct a three-dimensional of the physical object. The survey application generates a survey of components associated with a three-dimensional model of the physical object. For example, the components may include nails on drywall, switches on a dashboard, buttons on a factory machine, a boat or any industrial physical object.

U.S. Pat. No. 9,665,985 B2 (Mullins et al.) discloses a remote expert application that identifies a manipulation of virtual objects displayed in a first wearable device. The virtual objects are rendered based on a physical object viewed with a second wearable device. A manipulation of the virtual objects is received from the first wearable device. A visualisation of the manipulation of the virtual objects is generated for a display of the second wearable device. The visualisation of the manipulation of the virtual objects is communicated to the second wearable device.

US 2015/0235474 A1 and U.S. Pat. No. 9,665,985 B2 both disclose that a wearable device may include sensors, display, processor and a storage device. The wearable device may be a wearable computing device, a vehicle computer, a tablet computer, a navigational device, a portable media device or a smart phone of a user. The sensors may include, for example, a proximity or location sensor (e.g. near field communication, GPS, Bluetooth, Wi-Fi), an optical sensor (e.g. camera), an orientation sensor (e.g. gyroscope), an audio sensor (e.g., a microphone) or any suitable combination thereof.

Different optical positional tracking systems that may be used in virtual reality (VR)/AR applications are described in WO 2016/077401 A1 (Valve Corporation). Example implementations comprise one or more receivers and one or more transmitters. Example transmitters contain two orthogonal rotators that each emit a fan-shaped laser beam. Each beam is swept as the rotors are spun at constant speed. Example optical receivers can be relatively small and mounted at convenient locations on the VR display. These receivers consist of small optical detectors that may be mounted on head-mounted displays. Example systems determine position by measuring the time at which each swept beam crosses each receiver/detector.

Other positioning systems are also available. Another system similar to Valve Corporation's optical positioning system is described in US 51002299 A. US 2018/0128897 A1, the contents of which are incorporated herein by reference, discloses a system for determining the position of a transmitter relative to a receiver using ultrasound. The transmitter emits an ultrasonic sound pulse and provides an indication of the time of emission of the sound electronically. A computer processor receives the time indication from the transmitter and three ultrasonic receivers positioned in a fixed arrangement. The receivers are not positioned collinearly and are spaced apart from each other by less than two times the wavelength of the sound. The computer processor estimates the relative position of the transmitter based on the time indication and time of flight of the ultrasonic sound to each of the three receivers. In preferred embodiments, the receivers are spaced apart from each other by less than the wavelength of the sound.

As disclosed by US 2017/0169612 A1 (Cashen et al.), the contents of which are incorporated herein by reference, an AR system may be detrimental to an operator if the virtual images projected by the system are misaligned, i.e. the virtual images are not positioned correctly with respect to the real-world targets they are intended to overlay) and/or the virtual images are distorted. US 2017/0169612 A1 discloses an alignment system that may be configured to consider a number of dynamic and static factor inputs in real time such that when a graphic image is projected, the graphic image is substantially aligned with the real-world target it is intended to overlay and the graphic images displayed substantially free of distortion.

US 2013/0235169 A1 (Kato et al.), the contents of which are incorporated herein by reference, discloses an HMD that includes: display which displays a three-dimensional video image; a position obtaining unit which measures a position of an inner corner or tail of an eye of a viewer with respect to the display; a standard position storage unit which obtains in stores, as a standard position relating to the position, the measured position of the inner corner or outer corner of the eye, in calibration for determining the standard position; a position Detecting unit which detects, as a position, a difference between the standard position and a newly measured position of the inner corner or outer corner of the eye of the viewer viewing content with respect to the display; and an image processing unit which performs image processing on the 3D video image to be displayed on the display, to rotated or parallelly move the 3D video image according to the detected position gap.

US 2017/0090203 A1 (Mullins and Ries) discloses a head-mounted device that includes a sensor, transparent display and a processor comprising an augmented reality application and alignment module. For example, the head-mounted device may be a computing device with a camera and a transparent display such as a tablet, smartphone or a wearable computing device (e.g., helmet or glasses).

SUMMARY OF THE INVENTION

In accordance with an aspect of the present invention, there is provided a wearable augmented reality (AR) headset for displaying a virtual image of a building information model (BIM) to a user that is positioned and oriented to an extrinsic site coordinate system of a construction site. The headset is particularly aimed at use by builders and other tradespersons on a construction site or any other location where a building, construction, fitting or installation task is to be carried out an accurate location.

Suitably, the headset may comprise an article of headwear such, for example, as a construction helmet that is configured to be worn by the user.

The headset may have one or more position-tracking sensors mounted thereon which are configured to output sensor data representing responses of the one or more sensors to one or more signals propagating in the locality of the construction site that allow the position and orientation of the headset to be determined. Suitably, the one or more signals may be emitted by a position tracking system that is set up at the construction site. Suitable position-tracking systems are known to those skilled in the art. A position-tracking system, which is used in embodiments of the present invention, is an inside-out positional tracking system as described in more detail below.

The one or more signals may be emitted by one or more corresponding beacons. The precise location of the one or more beacons on the construction site may be known. Alternatively the tracking system may be used to determine the position of one or more control points of known location such that the location of other objects tracked by the position tracking system, such as the headset, can be calculated by reference to the location of the control points.

In some embodiments, the one or more signals may consist of electromagnetic radiation, e.g. optical or radio waves. In some embodiments, a sweep-beam optical tracking system may be used as described in more detail below. Such a system may employ infrared signals emitted by one or more beacons. In some embodiments, a WiFi tracking system may be used. However, some embodiments may utilise other types of signals such, for example, acoustic waves.

In some embodiments, ultrasound may be used, with the responses of the one or more position-tracking sensors to one or more ultrasonic signals impinging on the headset being used to triangulate the location and orientation of the headset on the construction site. A system and method for tracking the position of an object using ultrasound is disclosed by US 2018/0128897 A1.

The headset may comprise an augmented reality display system. The augmented reality display system may include a display assembly having an in-use position within the user's field of view that is fixed relative to the position-tracking sensors. It will be understood that in some embodiments, the display assembly may be selectively movable from the-use position to a different position, for example in which the display assembly is removed from in front of the user's eyes. For instance, the display assembly may be hinged or otherwise attached to the article of headwear for movement between the in-use position and a "non-in-use" position. However, in the in-use position, the display assembly may be positioned stably relative to the position-tracking sensors on the article of headwear, such that the display assembly display may not move relative to the position-tracking sensors when it is in the in-use position.

Suitably, the display assembly may include at least one display and be capable of displaying the virtual image to the user while allowing the user to view his or her surroundings through the display assembly. The display may be transparent or semi-transparent. Typically, in addition to the display itself, the display assembly may include at least one lens for viewing an image conveyed by light emitted from the display. The lens may suitably be positioned between the display and the user's eyes. In some embodiments, the lens may comprise a collimator such that the virtual image appears to the user to be positioned at infinity. Alternatively, the lens may cause the light to diverge, such that the virtual image appears at a focal distance in front of the user that is closer than infinity. For instance, in some embodiments, a lens may be used in conjunction with the display to provide that the virtual image represented by light emitted from the display appears to the user at a focal distance in the range 2-10 m. It will be appreciated that the characteristics of the display assembly will also define the field of view of the display assembly, its exit pupil size and the like. These and other physical and optical properties and characteristics of the display assembly may be taken into account when correctly positioning the virtual image of the building information model in accordance with the present invention as described in more detail below.

The augmented reality display system may be configured to receive image data representing the virtual image of the building information model and to display the virtual image on the display. The virtual image is perceived by the user as if projected by a virtual camera that is centred on the user's eye.

The headset may further comprise a display position sensor for detecting the position of the display relative to the user's head and for outputting display position data representing the same. Further or alternatively, the headset may include an alignment device for ensuring that the display is correctly positioned relative to the article of headwear. It will be understood by those skilled in the art that the position of the headset on the user's head may change in use even when the user is looking in the same place. This may be especially true when the user is engaged in manual operations of the kind typically involved in carrying out construction tasks on a building site. It is important in accordance with the invention to ensure the virtual camera remains correctly aligned with the user's eye such that the virtual image is seen by the user in the correct place relative to the real world. The display position sensor is therefore used in accordance with the invention to ensure that changes in the position of the headset, particularly the one or more displays, relative to the user's head are taken into account when positioning the virtual image of the building information model in the display(s).

The headset may comprise an electronic control system. The electronic control system may comprise a headset tracking sub-system that is configured to determine from the sensor data the location and orientation of the headset on the construction site within an intrinsic coordinate system defined by the position-tracking system, and to output headset tracking data representing the same.

The electronic control system may comprise a coordinate conversion engine configured to convert location data between the intrinsic coordinate system and the extrinsic coordinate system on the basis of a transformation. In some embodiments, the transformation may be derived by relating the coordinates of one or more control points of known location in the extrinsic coordinate system to their corresponding coordinates in the intrinsic coordinate system. The coordinates of the one or more control points in the intrinsic coordinate system may be derived from sensor data received from at least one sensor using the position-tracking system.

The electronic control system may be configured to receive the headset tracking data, the display position data and model data representing a building information model that is defined in the extrinsic coordinate system, process the model data using the coordinate conversion engine to produce derived model data that is defined in the intrinsic coordinate system, and, using the headset tracking data and display position data, render a virtual image of the building information model relative to the position and orientation of the article of headwear on the construction site and the position of the display on the user's head, generate image data representing the virtual image and transmit the image data to the augmented reality display system for viewing by the user on the display. In this manner, it is an object of the invention that the user should be able to see a virtual image of the building information model that is correctly positioned and oriented on the construction site in the real world within normal construction tolerances, overlaying the user's view of the construction site, so that he or she is informed where to carry out one or more construction tasks to a degree of accuracy that is sufficient to ensure the task is carried out according to the building information model, possibly within a specified allowable tolerance.

In some embodiments, the electronic control system may comprise an alignment engine for ensuring that the display is correctly positioned relative to the article of headwear. The alignment engine may be used in addition to or instead of the display position sensor.

In accordance with another aspect of the present invention, there is provided a method of displaying a virtual image of a building information model (BIM) that is positioned and oriented in an extrinsic site coordinate system of a construction site in a headset in accordance with the invention.

Unless the context suggests otherwise or indicated to the contrary, technical or other features described herein in relation to one or more particular aspects of the invention are applicable to all aspects of the invention.

The headset may therefore comprise an article of headwear that is shaped and dimensioned to be worn by a user with one or more position-tracking sensors mounted thereon or otherwise fixedly secured thereto, an augmented reality display system that includes at least one display; a display position sensor for detecting the position of the display relative to the user's head; and an electronic control system.

In some embodiments, the method of the invention may comprise the step of determining the position and orientation of the headset on the construction site in an intrinsic coordinate system which is defined by a position-tracking system on the basis of sensor data representing responses of the one or more sensors to one or more signals, e.g. electromagnetic radiation, propagating at the construction site as described above. The method may comprise generating headset tracking data representing the position and orientation of the headset on the construction site in the intrinsic coordinate system. These steps may conveniently be performed by a headset tracking system.

In some embodiments, the method of the invention may comprise the step of converting location data between the intrinsic coordinate system and the extrinsic coordinate system on the basis of a transformation. As described above, the transformation may be derived by relating the coordinates of one or more control points of known location in the extrinsic coordinate system to their corresponding coordinates in the intrinsic coordinate system using the position-tracking system. Suitably, the step may be carried out by a coordinate conversion engine.

As described above, the coordinates of the one or more control points in the intrinsic coordinate system may suitably be determined on the basis of sensor data received from at least one sensor.

In some embodiments, the method of the invention may comprise the steps of receiving display position data from the display position sensor, receiving headset tracking data and receiving model data representing the building information model as defined in the extrinsic coordinate system, processing the model data using the coordinate conversion engine to produce derived model data which is defined in the intrinsic coordinate system, and using the headset tracking data and display position data to render a virtual image of the building information model relative to the position and orientation of the article of headwear on the construction site and relative to the position of the display relative to the user's eye. The method may comprise generating image data representing the virtual image and transmitting the image data to the augmented reality display system for viewing by the user as a virtual image of the building information model.

As described above, the headset of the invention may comprise an electronic control system which, in some embodiments, may comprise a headset tracking sub-system and a coordinate conversion engine. The headset tracking sub-system may suitably be configured to cooperate with a position tracking system that is set up at the construction site as described in more detail herein. It will be understood that processing of the headset tracking data may be carried out on the headset using the headset tracking sub-system, but in some embodiments processing of the headset tracking data to determine the position and orientation of the headset on the construction site may be carried out of the headset, for example on a remote computer which is arranged to communicate with the headset through a wired or wireless connection. In some embodiments, the coordinate conversion engine may be arranged to run on a remote computer or server. Thus, in general, some of the processing steps carried out by the electronic control system may be performed of the headset on a remote computer or server and suitable means arranged for the transmission of data between the headset and the remote computer or server.

In accordance with yet another aspect of the present invention, there is provided a computer program comprising a set of instructions, which, when executed by a computerised device, cause the computerised device to perform a method of displaying in a headset a virtual image of a building information model (BIM) that is positioned and oriented in an extrinsic site coordinate system of a construction site. Typically, the computer program comprising a set of instructions which, when executed by a computerised device, because the computerised device to perform a method in accordance with the present invention as described above.

Thus, the headset may comprise an article of headwear that is configured to be worn by a user with one or more position-tracking sensors mounted thereon, an augmented reality display system that includes a display assembly having an in-use position within the user's field of view, the display assembly including at least one display, a display position sensor for detecting the position of the display relative to the user's head and an electronic control system.

In accordance with embodiments of the present invention, there is provided a method of viewing a three-dimensional building information model with an augmented reality head-mounted display in real world coordinates on a construction site to at least 5 mm accuracy, preferably at least 3 mm accuracy. Embodiments of the present invention may comprise:

(a) Tracking the augmented reality head-mounted display at the construction site using an optical inside-out position tracking system to locate the augmented reality head-mounted display within a tracked volume in an intrinsic coordinate system used by the position tracking system to at least 5 mm;

(b) Using a portable tracked device to relate the intrinsic coordinate system to an extrinsic, real-world coordinate system by using a transformation to convert between known locations/control points in the extrinsic coordinate system to the corresponding positions of the control points in the intrinsic coordinate system as defined by the position tracking system;

(c) Using an eye-tracking device to relate the position of at least one of the user's eyes to the augmented reality head-mounted display; and/or (d) Using computer software to fuse positional tracking data representing the location of the headset with eye-tracking data representing the position of the augmented reality head-mounted display on the user's head and data representing optical properties of the augmented reality head-mounted display to display a virtual BIM model through the augmented reality head-mounted display in real world coordinates.

Embodiments of the present invention aim to provide builders/trade contractors with a method of viewing a BIM model in real world coordinates using an augmented reality HMD to construction tolerances, which are typically to within 3 mm accuracy, and/or the ability to validate their work in real time. This may eliminate the need for the continual presence of a site engineer, which may minimise the degree to which work crew must interpret construction drawings and determine unmarked locations between reference points or markers, thereby obviating compounding of errors in positioning reference points based on previously located reference points or control points. This may also eliminate the need for a theodolite for validation work as it seeks to provide builders and trade contractors with real time validation information.

In a different aspect of the invention, headset tracking may comprise generating external tracking data based on the location and orientation of the headset by using sensors external to the headset. Tracking sensors such for example as optical sensors (e.g. depth-enabled 3-D camera), wireless sensors (Bluetooth, Wi-Fi), GPS sensor or audio sensors may be used to determine the location of the headset, distance of the headset to the tracking sensors in the physical environment (e.g. sensors placed in corners of the venue or room), the orientation of the headset, for example to determine where the user is looking.

In some embodiments, rendering the virtual image may comprehend rendering virtual objects based on headset tracking data from the headset and an augmented reality database. The headset tracking data may represent the location and orientation of the headset based on sensor data received from sensors internal to the headset. The sensors may include, for example, proximity or location sensors (e.g. near field communication, GPS, Bluetooth, Wi-Fi), an optical sensor (e.g. camera), an orientation sensor (e.g. gyroscope), an audio sensor (e.g. a microphone) or any suitable combination thereof. For example, the sensors may include a rear facing camera and a front facing camera in the headset.

In accordance with yet another aspect of the present invention, there is provided a method of setting out a construction site which comprises tracking a portable setting-out tool at the construction site using an optical inside-out positional tracking system to locate the setting-out tool within a tracked volume in an intrinsic coordinate system used by the tracking system and relating the intrinsic coordinate system to an extrinsic, real-world coordinate system using a transformation derived by relating known locations in the real world coordinate system of one or more control points at or near the construction site to the corresponding positions of the control points in the intrinsic coordinate system, as determined by the positional tracking system.

By an "inside-out positional tracking system" herein is meant a tracking system in which a sensor, for example an opto-electronic sensor or microphone, provided on an object to be tracked within a tracked volume is arranged to detect or measure one or more properties of one or more incident signals (e.g. electromagnetic radiation or ultrasonic waves or pulses) that are indicative of an angular distance of the sensor from a source of the radiation. Typically, the source of the signal or radiation may be fixed. The object to be tracked may, for example, be the headset of the present invention.

The signal (e.g. electromagnetic radiation) may be directional. In particular, the radiation may be modulated in such a manner as to indicate the bearing or angular distance of the source. The signal or radiation may, for example, be spatially modulated or attenuated across the tracked volume. For instance, the intensity of the electromagnetic radiation may vary with angular distance to the source.

Typically, the electromagnetic radiation may be in the form of a beam, e.g., a laser beam, which varies temporally, for example by sweeping through the tracked volume.

The sensor may detect a transient change in the incident signal, e.g. e.m. radiation.

In some embodiments, the beam may sweep at constant speed through the tracked volume, so that the time at which the beam is incident on the sensor is indicative of the angular distance of the sensor to the source.

In some embodiments, the beam may comprise a carrier wave which is modulated to encode data.

For example, the carrier wave may be modulated to encode data which indicates the absolute phase of the beam. The angular distance from the sensor to the source may be derived from the absolute phase of the beam and the time at which the beam is incident on the sensor.

In some embodiments, the carrier wave may be modulated to encode dynamic data indicating the angular distance of the beam to the source. In this case, the angular distance from the sensor to the source may be "read" from the beam.

Where the beam is modulated to encode data, the sensor may suitably incorporate a light-to-digital converter for demodulating the carrier wave to recover the encoded data.

The beam may have a planar, fan-shape. Suitably, the electromagnetic radiation may be non-visible light, preferably infrared.

In some embodiments, the electromagnetic radiation may be modulated in two mutually transverse (e.g. orthogonal) planes for determining the angular position of the sensor on two transverse axes. For instance, two mutually transverse beams may be swept across the tracked volume.

A suitable beam may be generated by mounting a laser on a rotor within a base station. As indicated above, the rotor may operate at a constant angular speed. In some embodiments, two (or more) lasers may be mounted on a single rotor, and a suitable opto-mechanical arrangement may be provided for sweeping beams from the lasers in mutually transverse directions.

Alternatively, two or more rotors may be provided, which are arranged to rotate about mutually transverse axes. Each of the two or more rotors may carry one or more lasers.

Where two or more beams of electromagnetic radiation are employed, they may have mutually different frequencies to allow the sensor to distinguish between the beams.

One or more sensors may be provided on the object to be tracked, and there may be one or more sources of the e.m. radiation.

The location of the object to be tracked can be determined by triangulating the position of one or more sensors relative to multiple sources of radiation.

Alternatively, the location of the object can be determined by triangulating the positions of multiple sensors on the object relative to at least one source of radiation. The relative positions of the multiple sensors on the tracked object should be known.

Where there are multiple sources of radiation, each source may emit one or more beams of electromagnetic radiation. Suitably, each source may comprise a base station that is operable to emit two mutually transverse beams as described above. Each beam from each base station may have a different frequency.

If the radiation is modulated on two mutually transverse planes, the location of the object can be determined in three dimensions.

Typically, the sensors are not cameras, but respond to incident electromagnetic radiation by generating a detectable electrical signal. Suitably, the sensors may comprise photodiodes that are responsive to non-visible light, e.g., infrared. For example, the sensors may comprise silicon photodiodes. The sensors may further comprise a light-to-digital circuit which incorporates an amplifier for amplifying the electrical signal from the photodiode, a discrete envelope detector and a fast comparator. The comparator should preferably have a relatively small amount of hysteresis. Such a circuit is arranged to deliver a digital pulse when electromagnetic radiation falls transiently on the sensor.

The angular distance of a sensor to a source of a swept beam of electromagnetic radiation may be calibrated by reference to an absolute angular position of the beam when it falls incident upon the sensor.

Alternatively, the angular direction of the beam relative to the source may be dynamically encoded within the beam, which is used as a carrier signal.

In a further alternative, the angular distance of the sensor to the source may be calculated from an elapsed time between a synchronisation signal and when the beam falls incident upon the sensor.

Typically, such a synchronisation signal may comprise an omnidirectional flash of electromagnetic radiation which, like the beam itself, is preferably non-visible, e.g., infrared.

A suitable inside-out optical positional tracking system is disclosed by WO 2016/077401 A1, the contents of which are incorporated herein by reference.

An advantage of using such an inside-out optical positional tracking system is that it can locate the position of a sensor within a tracked volume to an accuracy of less than 3 mm, more preferably less than 1 mm. The methods of the present invention may make use of an optical inside-out tracking system for accurately tracking the position of a portable setting-out tool at the construction site for locating where specific operations such, for example, as a construction task are to be carried out at the construction site, in accordance with construction drawings. In some embodiments, for example, the setting-out tool may be used to locate reference points at the construction site.

Thus, in some embodiments, the methods of the invention may comprise calculating the location of the setting out tool in the extrinsic, real-world coordinate system using the transformation and indicating the position of the setting-out tool in real-world (site) coordinates using a user interface. Suitably, the user interface may include a display such, for example, as a flat panel display, for displaying the position of the tool in the site coordinates.

In a particular aspect of the invention, the setting-out tool may comprise a headset comprising augmented reality glasses that are wearable by a user and include at least one display for displaying information relating to the position of the setting-out tool on the construction site. For instance, the augmented reality glasses may be operable to display information relating to one or more construction tasks to be carried out at specific locations on the construction site. In some embodiments, the augmented reality glasses may be operable to display the position of the headset, or of a peripheral attached to the headset that carries one or more sensors forming part of the positional tracking system, in the extrinsic, real-world coordinates.

In some embodiments, the augmented reality glasses may be operable to display a virtual image of a building information model (BIM) that is defined in the extrinsic real-world coordinates. In accordance with the present invention, the virtual image may be a 3-D image that is correctly located and oriented relative to construction site, and displayed to a user in a correct context for the user's position on the site, by using the transformation to convert the real-world site coordinates of the building model into the intrinsic coordinate system.

The headset may comprise a hard hat such, for example, as a construction helmet of the kind known in the art, which is adapted to carry a plurality of sensors forming part of the positional tracking system. Suitably, the augmented reality glasses may be incorporated into the hard hat to ensure a controllable distance between the glasses and the hard hat which carries the sensors. However, in some embodiments, the augmented reality glasses may be separate from the hard hat.

The inside-out positional tracking system may comprise one or more base stations that can be set up at spaced locations at the construction site, each of which is operable to emit spatially modulated electromagnetic radiation such, for example, as a beam of light that is swept across the construction site, and a plurality of sensors on the setting-out tool that are responsive to the electromagnetic radiation. In some embodiments, the base stations may be set up at a spacing of up to about 10 m, preferably up to about 5 m. As described above, the modulated e.m. radiation may be indicative of the angular distance between a sensor and a base station, so the sensors on the setting-out tool may be used to determine the position and/or orientation of the setting-out tool in the intrinsic coordinate system.

Suitably, the positional tracking system may be calibrated to the extrinsic, real-world coordinate system by positioning the setting-out tool at a control point of known location in the extrinsic, real-world coordinate system and determining the corresponding position of the setting-out tool at the control point in the intrinsic coordinate system. Suitably the setting-out tool may have two or more sensors, typically at least three sensors. One of the sensors may be positioned accurately at the control point. The positions of the other sensors relative to the one sensor may be known, allowing the positions of the other sensors in the extrinsic real-world coordinates to be calculated. The positions of all two, three or more sensors may be determined in the intrinsic coordinates using the inside-out tracking system.

Alternatively, or in addition, the positional tracking system may be calibrated to the extrinsic, real-world coordinate system by positioning the tool sequentially at two, three or more control points within the tracked volume that have known locations in the real-world coordinate system and determining the position of the tool in the intrinsic coordinate system at each control point.

Alternatively, or in addition, the positional tracking system may be calibrated to the extrinsic, real-world coordinate system using sensors (e.g. optical sensors) positioned at two, three or more control points within the tracked volume that have known locations in the real-world coordinate system, and determining the positions of the sensors in the intrinsic coordinate system. In some embodiments, the tracking system may be periodically recalibrated in relation to the sensors at the at least two or three control points.

The location of a control point in the extrinsic coordinate system may be determined using a total station in the manner known to those skilled in the art of setting-out a construction site. Thus, the position of a control point at the construction site may be determined by triangulation from two or more points whose positions are known accurately in a geodetic coordinate system such, for example, as Ordnance Survey or WGS 84.

In another aspect of the invention, there is provided equipment for setting out a construction site comprising at least one portable setting out tool, an inside-out positional tracking system for locating the setting-out tool within a tracked volume in an intrinsic coordinate system used by the tracking system and an electronic control system comprising a coordinate conversion engine for converting the coordinates of the setting-out tool in the intrinsic coordinate system, as determined by the tracking system, to corresponding coordinates in an extrinsic, real-world coordinate system based on a transformation for converting between the two coordinate systems.

Suitably, the transformation is derived from relating the positions of one or more control points of known location in the real-world coordinate system to their corresponding positions in the intrinsic coordinate system as determined using the inside-out positional tracking system.

The setting-out tool may comprise a user interface such, for example, as a display, for indicating the position of the setting-out tool in the extrinsic, real-world coordinate system to a user. Thus, the portable setting-out tool may be used, as described above, to locate specific reference points on the construction site for setting out the construction site in accordance with construction drawings. For instance, the setting-out tool may comprise a flat panel or "calculator type" display.

The positional tracking system may comprise at least one sensor, which is attached to the setting-out tool, and a least one base station that is operable to emit a signal such, for example, as modulated electromagnetic radiation that is indicative of angular distance to the base station. Suitably, the at least one sensor and a least one base station may be as described above.

In some embodiments, the portable setting-out tool may comprise a probe having a tip. The setting-out tool may comprise a sensor that is positioned at the tip of the probe for accurately positioning the sensor at a location on the construction site. The position of the portable setting-out tool may be calculated as the position of the sensor at the tip of the probe.

In some embodiments, the positional tracking system may comprise a plurality of base stations.

In some embodiments, the at least one base station be operable to emit at least one beam of electromagnetic radiation, and to sweep the beam across the tracked volume. Suitably, the base station may be operable to sweep the beam across the tracked volume at a controlled or constant speed.

The tracking system may comprise a tracking engine for determining the position of the setting-out tool in the intrinsic coordinate system based on sensor data received from the at least one sensor, for example timing data representing when the sensor responds to the beam, or angular distance data encoded within the beam. Suitably, the tracking engine may be accommodated within the portable setting-out tool, so that the calculation of the position of the portable setting-out tool within the tracked volume in the intrinsic coordinate system is performed entirely within the portable setting-out tool.

However, in some embodiments, the tracking engine may be implemented in a control device such, for example, as a computer that is separate from the setting-out tool. This arrangement may be especially convenient where the equipment comprises more than one portable setting-out tool. The control device and the one or more setting-out tools may be provided with respective data transceivers for communicating data between the or each setting-out tool and the control device. For instance, sensor data from the at least one sensor on the setting-out tool may be transmitted to a remote control device for calculation of the position of the sensor within the tracked volume in the intrinsic coordinate system, and tracking data representing the position of the sensor in the intrinsic coordinate system may be transmitted to the setting-out tool for conversion to the extrinsic real-world coordinate system using the conversion engine.

In a further variant, the coordinate conversion engine may also be implemented within a separate control device, and tracking data representing the position of the one or more setting-out tools in the extrinsic coordinate system may be transmitted to the setting-out tool for display to the user or users.

Where a plurality of setting-out tools are provided, each may transmit to the separate control device data representing a unique identifier which identifies the specific setting-out tool. The control device may be operable to use the unique identifiers of the multiple setting-out tools to ensure the correct tracking data is sent to each setting-out tool.

The one or more setting-out tools may be connected to the control device for data transfer by means of cables or wirelessly.

In some embodiments, the electronic control system may further comprise a calibration engine for generating the transformation for relating the intrinsic coordinate system to the external real-world coordinate system by using the inside-out positional tracking system to locate the positions in the intrinsic coordinate system of one or more control points of known location in the real-world coordinate system.

The electronic control system may conveniently be housed within the portable setting-out tool. However, in some embodiments, the electronic control system may be disposed in a separate control device of the kind described above. The position of the portable setting-out tool in the real-world coordinates may be calculated in the control device and transmitted to the setting-out tool for display to a user. Similarly, the transformation may be generated using the calibration engine in the separate control device and data representing the transformation communicated to the conversion engine for converting coordinates in the intrinsic coordinate system to corresponding coordinates in the extrinsic system.

In some embodiments, the equipment according to embodiments of the invention may further include at least one calibration tool which comprises at least one sensor that can be positioned at a location on the construction site of known coordinates in the extrinsic, real-world coordinate system and tracked using the inside-out positional tracking system to determine its coordinates in the intrinsic coordinate system. The calibration engine may be used for relating the position of the corresponding coordinates of the sensor in the intrinsic and extrinsic coordinate systems to derive the transformation.

Suitably, the equipment may include a plurality of such calibration tools, each having at least one sensor.

In another embodiment, the equipment may include at least one calibration tool having a plurality of sensors.

In some embodiments, a calibration tool may be configured to be fixed at a control point of known location for periodic recalibration of the positional tracking system. To this end, the calibration tool may comprise a sensor, as described above, and a mounting for fixedly securing the calibration tool to an object at a control point.

In some embodiments, the setting-out tool may comprise a headset. The headset may incorporate an augmented reality display for displaying information related to the position of the setting-out tool on the construction site.

In accordance with a further aspect of the present invention, there is provided a headset for use in setting out a construction site which comprises an article of headwear having a plurality of sensors mounted thereon, augmented reality glasses incorporating one or more displays for displaying a virtual image of a building information model (BIM) when viewed by a user and an electronic control system. Suitably, the headset of the invention further comprises means for detecting the position of the augmented reality glasses on the user's head, more particularly the position of the one or more displays relative to the user's eyes.

The electronic control system may comprise a model positioning engine for receiving and processing model data representing the building information model defined in an extrinsic, real-world coordinate system and using a transformation between the extrinsic coordinate system and an intrinsic coordinate system for positioning and orienting the model in the intrinsic coordinate system.

The electronic control system may comprise an image rendering engine for receiving headset tracking data representing the position and orientation of the article of headwear on the construction site in the intrinsic coordinate system, rendering a virtual image of the model relative to the position and orientation of the article of headwear and transmitting the image to the one or more displays where it is viewable by a user as a virtual image of the model.

The image rendering engine may also receive display position data representing the position of the one or more displays relative to the user's eyes. Accordingly, in some embodiments, the image rendering engine may be configured for receiving headset tracking data representing the position and orientation of the article of headwear on the construction site in the intrinsic coordinate system, display position data representing the position of the one or more displays relative to the user's eyes, rendering a virtual image of the model relative to the position and orientation of the article of headwear on the construction site and the position of the augmented reality glasses relative to the user's eyes and transmitting the image to the one or more displays where it is viewable by a user as a virtual image of the model.

In some embodiments, the headset tracking data may be derived from sensor data representing the responses of a plurality of sensors on the article of headwear to modulated electromagnetic radiation emitted by one or more base stations at the construction site, the modulation of the electromagnetic radiation being indicative of angular distance to the one or more respected base stations.

In some embodiments, the transformation may be derived by relating the coordinates of one or more control points of known location in the extrinsic coordinate system to their corresponding coordinates in the intrinsic coordinate system, the coordinates of the one or more control points in the intrinsic coordinate system being derived from sensor data representing the responses of one or more sensors positioned at the one or more control points to the modulated electromagnetic radiation.

Thus, the sensors on article of headwear may be responsive to one or more beams of non-visible light, preferably infrared, which are swept across the construction site from one or more base stations for tracking the positions of the sensors. Advantageously, as described above, the or each base station may emit two beams of non-visible light in mutually transverse, preferably orthogonal, planes. The or each beam may have a planar, fan-shape.

The sensors may be opto-electronic sensors that respond to the electromagnetic radiation by generating a detectable signal which can be converted to a digital signal by a suitable light-to-digital converter. In some embodiments, the digital signal may encode timing data for deriving the tracking data. The timing data may be time stamped and aggregated by a field programmable gate array (FPGA). Alternatively, the digital signal may encode angular distance data obtained by demodulating data contained within the beam as a carrier signal that represents the instantaneous angular distance of the beam to its source.

Suitably, the article of headwear has at least five sensors at known positions on the headset relative to one another. In some embodiments, the article of headwear may comprise more than five sensors, preferably more than 10 sensors, more preferably more than 20 sensors for accurately determining the position and orientation of the headset in the intrinsic coordinate system. In some embodiments, the article of headwear may comprise up to 32 sensors.

In some embodiments, the display position data may be generated by one or more display position sensors on the article of headwear. Suitable display position sensors will be known to those skilled in the art and include, for example, position sensors of the kind disclosed by US 2013/0235169 A1 or U.S. Pat. No. 9,754,415 B2, the contents of which are incorporated herein by reference.

For example, in some embodiments the display position data may be generated by at least one eye-tracking device for tracking movement of a user's eye. The eye-tracking device may be configured for tracking the position of the user's eye. Suitably, the display position data may comprise data representing a position of at least one of the pupils of the user's eyes relative to the display and, more particularly, the display position data may comprise data representing a position of at least one of the centres of the pupils of the user's eyes relative to the display. In some embodiments, the eye-tracking device may include at least one infrared camera that is mounted on the headset and arranged to emit infrared radiation onto the user's eye and at least one infrared detector that detects reflected infrared radiation.

Alternatively, the display position sensor may comprise, for example, an inwardly-facing CMOS detector that images surface detail of the user's head, skin and/or hair to determine motion of the display with respect to the skin and/or hair. Such motion may correspond to relative movement between the display and the user's head. In some embodiments, the CMOS detector may comprise an LED light source and either a single lens or a microlens array to guide the emitted and reflected light rays. The CMOS detector may be positioned at any suitable location on the display assembly. Any suitable optical sensor technology and configuration may be used for an inwardly-facing optical detector. For example, a laser or LED, lens and CMOS sensor found in any optical mouse may be used as a relative motion detector between the display and the user's head.

In other examples, the display position sensor may comprise an outwardly-facing sensor such, for example, as a camera facing away from the user's head and located on the display assembly. The camera may capture two-dimensional image information and/or depth information from the physical environment and physical objects within the environment of the user. For example, the camera may include a depth camera, visible light camera, infrared light camera and/or a position tracking camera.

In some embodiments, the virtual image of the BIM model may comprise a synthetic 3-D image which is displayed to a user in the one or more displays in the augmented reality glasses. Suitably, the glasses may comprise two displays for displaying the synthetic image as a stereoscopic image. It will be appreciated by those skilled in the art that the virtual image that is generated in accordance with the present invention may be adjusted according to the optical and/or physical properties of the one or more displays. Thus, as known in the art, the virtual image should be matched to the focal distance and/or exit pupil size of the augmented reality display.

The virtual image of the BIM model should have a frame rate of at least 30 Hz, and preferably at least 60 Hz, so that the virtual image is updated smoothly when the headset is moved relative to the construction site. In one embodiment, the frame rate of the image rendering engine may be about 90 Hz.

The beams of non-visible light from the one or more base stations may move across the construction site at a frequency that is less than the desired frame rate of the virtual image. For instance, in some embodiments, the beams of light may have a sweep-frequency of in the range 30-60 Hz. The electronic control system of the headset may therefore further comprise at least one inertial measurement unit (IMU). Suitable IMU units are available to those skilled in the art, and may have a sampling rate of, for example, 1000 Hz, with a reporting frequency of, e.g., 500 Hz.

The tracking data representing the position and orientation of the article of headwear in the intrinsic coordinate system may fuse movement data from an IMU unit with positional data derived from the sensor data outputted by the sensors. The tracking module may therefore fuse the sensor data with movement data received from the IMU to produce the tracking data at a frequency greater than may be possible using the sensor data alone to provide a smooth frame rate for the virtual image. Suitably, the tracking data representing the position and orientation of the article of headwear in the intrinsic coordinate system is based primarily on the movement data from the IMU unit, and is updated regularly with more accurate position and orientation information derived from the sensor data.

It will be appreciated by those skilled in the art that the headset the present invention may be used for setting out a construction site by displaying to a worker at the site a virtual image representing a construction task to be carried out. The virtual image can be displayed in its correct position and orientation on the construction site as defined by the BIM model, in context relative to the worker. By virtue of the transformation between the intrinsic coordinate system of the positional tracking system and the extrinsic, real-world coordinate system which is established for the construction site, the BIM model can be correctly positioned and oriented in the intrinsic coordinate system used by the tracking system and, by virtue of tracking the position and orientation of the article of headwear, can be displayed to the worker in its proper context. In this way, once control points have been located using conventional methods such, for example, as with a total station, it is unnecessary to locate further reference points or markers at the construction site or to interpret construction drawings as to how the task should be carried out at the construction site in relation to reference points or markers.

Instead, in accordance with the present invention, once control points have been located using conventional methods, tasks to be carried out at the site can be displayed directly to a worker at the correct location and in the correct orientation, avoiding the need for interpolation between reference points or markers or interpretation of the construction drawings.

Suitably, the electronic control system may further comprise a tracking engine for processing sensor data received from the sensors on the article of headwear to calculate the position and orientation of the article of headwear at the construction site in the intrinsic coordinate system.

In some embodiments, the electronic control system may further comprise a display position tracking engine for processing display position data received from the one or more display position sensors on the article of headwear to determine the position of the one or more displays on the article of headwear relative to the user's eyes.

The electronic control system may comprise one or more processors, one or more memory units and at least one data storage device storing software comprising a model positioning module that is executable by the one or more processors to process the model data for positioning and orienting the model in the intrinsic coordinate system using the transformation, and an image rendering module that is executable by the one or more processors to process the tracking data, model data and optional display positioning data for rendering the virtual image of the BIM model relative to the position and orientation of the article of headwear and optionally relative to the position of the display on the user's head. It will be appreciated that the electronic control system may comprise one or microcontrollers for implementing the model positioning engine and/or image rendering engine, or one or more microprocessors with separate memory and data storage devices that are interconnected in the usual way by a local data bus.

The electronic control system may further comprise at least one data communication device.

The software may include a model downloading module that is executable by the one or more processors to receive the model data from a remote server via the data communication device.

In some embodiments, the software may further comprise a transformation receiver module that is executable by the one or more microprocessors for receiving and storing the transformation in the at least one data storage device.

In some embodiments, the software may further comprise a tracking module that is executable by the one or more processors to process the sensor data received from the sensors on the headset to calculate the position and orientation of the article of headwear at the construction site in the intrinsic coordinate system.

As described above, the article of headwear according to embodiments of the invention may comprise a hard hat such, for example, as a construction helmet, with the augmented reality glasses attached to or separate from the helmet.

The present invention also comprehends computer-executable software for performing a method of setting-out a construction site in accordance with the present invention as described herein.

Thus, in a yet further aspect of the present invention there is provided computer software for controlling equipment for setting out a construction site which comprises a tracking module for determining the position and/or orientation of a portable setting out tool in an intrinsic coordinate system and a coordinate conversion module for converting the coordinates of the setting-out tool in the intrinsic coordinate system to corresponding coordinates in an extrinsic, real-world coordinate system using a transformation for converting between the intrinsic and extrinsic coordinate systems.

In accordance with the yet further aspect of the invention therefore, the coordinate conversion module may be executable by a processor for applying the transformation to tracking data representing the position and/or orientation of the setting-out tool in the intrinsic coordinate system, as calculated by the tracking module, to determine the position and/orientation of the setting-out tool in the extrinsic coordinate system.

As described above, the transformation is suitably derived from relating the positions of one or more control points of known location in the real world coordinate system to their corresponding positions in the intrinsic coordinate system as determined using an inside-out positional tracking system The tracking module may be executable by a processor to calculate the position and/or orientation of the setting-out tool based on sensor data representing the output of one or more sensors on the setting-out tool that respond to signals (e.g. modulated electromagnetic radiation) emitted by at least one base station at the construction site.

As described above, the one or more sensors may be opto-electronic sensors such, for example, as photodiodes which are responsive to incident light from the one or more base stations.

The modulated light may vary temporally. The one or more sensors may generate electrical signals that may be converted to digital pulses that are time stamped and aggregated (e.g. where there is more than one sensor) to provide timing data indicative of an angular distance from a sensor to a base station.

In some embodiments, the modulated light may be modulated to encode data.

In some embodiments, the data may represent the absolute phase of the light to enable an angular distance between a sensor and a base station from which the light emanates to be calculated based on the time when the light is incident on the sensor.

In some embodiments, the data may represent a bearing to a base station from which the light emanates. The light may be a being which swept across the tracked volume, and the data may be updated dynamically as the bearing of the beam relative to the base station changes.

The tracking module may therefore be executable by a processor to calculate the position and/orientation of the setting-out tool based on such sensor data from the sensors. In some embodiments, as described above, the tracking module may be executable by a processor to calculate the position and/or orientation of the setting-out tool based on movement data representing the output of an IMU unit, which is squelched periodically with more accurate position and/orientation information derived from the data representing the output of the one or more sensors.

The software in accordance with the yet further aspect of the invention may further comprise a calibration module that is executable by a processor to determine the positions in the intrinsic coordinate system of a plurality of control points of known locations in the extrinsic, real-world coordinate system from data representing a response of a sensor at each control point to the modulated light and to generate a transformation for relating the intrinsic coordinate system to the extrinsic, real-world coordinate system.

In some embodiments, the software may further comprise a display module that is executable by a processor for controlling a display to display the position of the setting-out tool as determined by the tracking module in the extrinsic, real-world coordinates. In some embodiments, the display may be provided on the setting-out tool. In some embodiments, the display may be provided in a headset, for example comprising an augmented reality display.

In some embodiments, the software may further comprise a data communication module that is executable by a processor for receiving and storing model data representing a building information model (BIM) defined in the extrinsic, real-world coordinate system.

In some embodiments, the software may further comprise a model positioning module that is executable by a microprocessor for converting the position and orientation of the building information model as represented by the model data from the extrinsic coordinate system to the intrinsic coordinate system using the transformation.

In some embodiments, the software may further comprise an image rendering module that is executable by a processor for rendering a virtual image of the building information model for display in an augmented reality display forming part of the setting-out tool using the converted model data and the position and orientation of the setting-out tool, as represented by the tracking data.

In some embodiments, the software may further comprise a transformation receiver module that is executable by a processor for receiving and storing the transformation in a data storage device.

In some embodiments of the invention, the computer software may comprise an alignment module for ensuring that the glasses are correctly positioned relative to the hard hat.

In another aspect of the present invention there is provided calibration software for calibrating an inside-out positional tracking system for use in setting out a construction site comprising machine code that is executable by a processor for (i) receiving control point location data representing the positions of a plurality of control points at the construction site in an extrinsic, real world coordinate system, (ii) receiving control point tracking data representing the positions of the control points in an intrinsic coordinate system used by the tracking system, and (iii) relating the positions of the control points in the intrinsic and extrinsic coordinate systems to derive a transformation between the coordinate systems.

Suitably, the calibration software may comprise machine code that is executable by a processor to receive and process sensor data representing the response of a sensor at each control point to modulated electromagnetic radiation emitted by at least one base station at the construction site, which is indicative of an angular distance to the base station, to calculate the positions of the control points in the intrinsic coordinate system.

Advantageously, the machine code may be executable to repeat steps (i) to (iii) periodically to refresh the transformation.

BRIEF DESCRIPTION OF THE DRAWINGS

Following is a description by way of example only with reference to the accompanying drawings of embodiments of the invention.

In the drawings.

DETAILED DESCRIPTION

Position Tracking System

Figure 1:
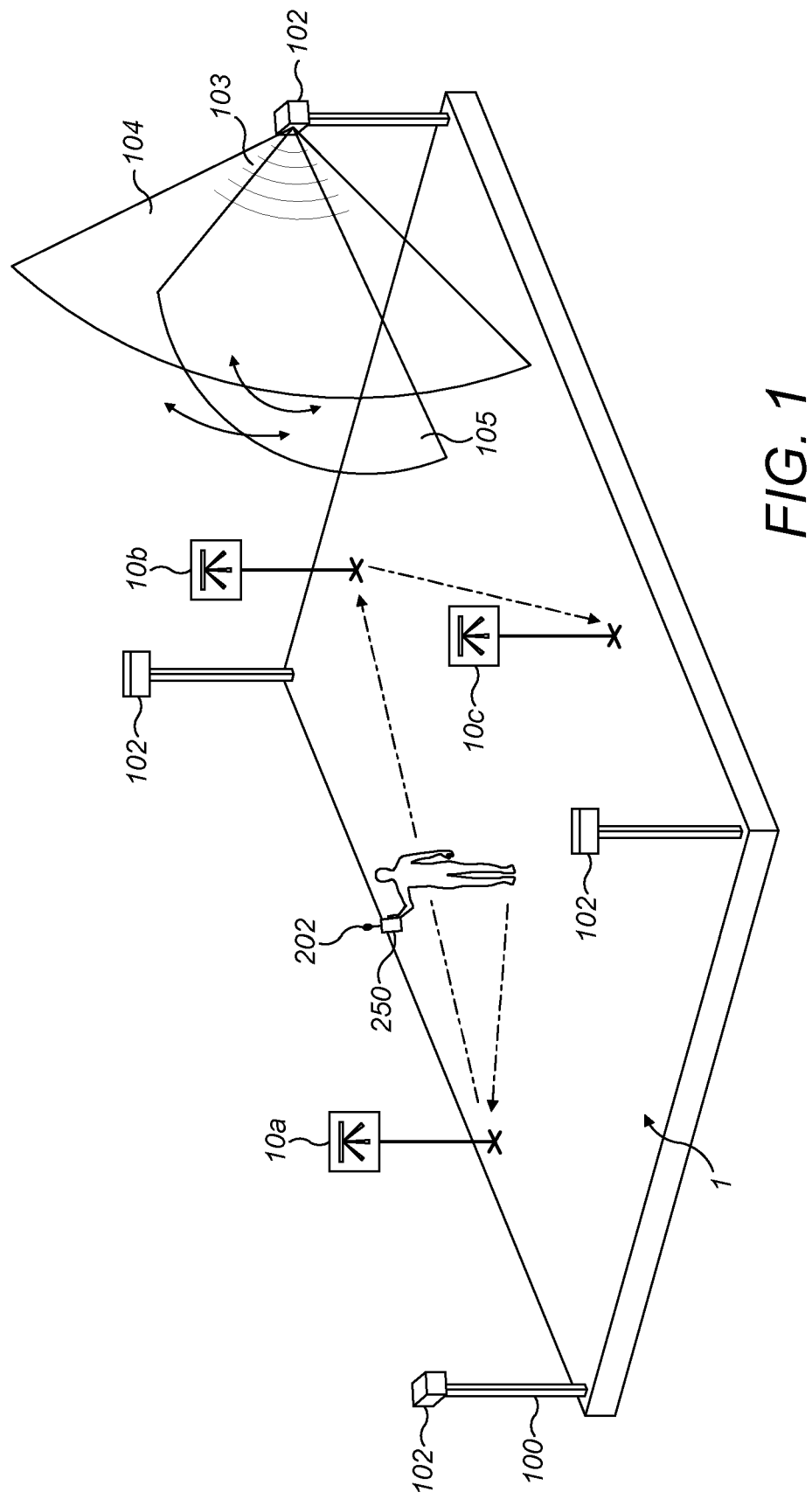
FIG. 1 is a schematic representation of a construction site where an inside-out positional tracking system is set up to track the position of a portable setting-out tool in accordance with the present invention. A plurality of control points of known locations are located at the construction site for calibrating the setting-out tool to a real world coordinate system.

A construction site 1 is indicated schematically in FIG. 1. Three control points 10*a*, 10*b* and 10*c* are located accurately at the control site 1 using a total station in the manner familiar to those skilled in the art of surveying. In particular, the control points 10*a*, 10*b*, 10*c* are positioned at the construction site 1 by triangulation from two or more points of absolute known location such as geographical triangulation points, benchmarks or other known geographical features at or adjacent the construction site. The locations of the points 10*a*, 10*b*, 10*c* may be expressed in any suitable real-world coordinate system such, for example, as WGS 84 or Ordnance Survey references.

Although three control points 10*a*, 10*b*, 10*c* are indicated in FIG. 1, in other embodiments, more than three control points may be established.

A laser-based inside-out positional tracking system 100 is set up at the construction site 1. In the present embodiment, the tracking system 100 comprises a plurality of spaced apart base stations 102, each of which is selectively operable to emit an omnidirectional synchronisation pulse 103 of infrared light and comprises two rotors that are arranged to sweep two linear non-visible optical fan-shaped beams 104, 105 across the construction site 1 on mutually orthogonal axes. In the present embodiment, the base stations 102 are separated from each other by a distance of up to about 5-10 m. In other embodiments, depending on the capabilities of the inside-out positional tracking system that is employed, the base stations 102 may be placed more than 10 m apart.

As shown in FIG. 1, in the present embodiment, four base stations 102 are employed, but in other embodiments fewer than four base stations 102 may be used, e.g. one, two or three base stations 102, or more than four base stations. The total number of base stations 102 used will depend on the area covered by the construction site 1. If more base stations 102 are used, a greater area can be covered.

In some embodiments, particularly where the construction site 1 covers only a small area, a single base station 102 may be sufficient, as described below, but preferably there are at least two base stations 102.

As mentioned above, a suitable inside-out positional tracking system is disclosed by WO 2016/077401 A1 (Valve Corporation), but other positional tracking systems may be used, provided they afford the level of accuracy required for setting out a construction site.

For instance, in some embodiments, an alternative inside-out positional tracking system may be employed (not shown), which comprises two or more base stations, each of which is operable to sweep two linear, non-visible optical fan-shaped beams across the construction site 1 on mutually transverse axes. The two beams generated by each base station may be produced by lasers mounted on separate rotors, as described above, or by two lasers mounted on a single rotor, with a suitable opto-mechanical arrangement for creating the two beams which sweep in mutually transverse directions. The beams may have mutually different frequencies and may serve as carrier waves to encode data representing a bearing (e.g. azimuth or inclination respectively) to the base station. In such an arrangement, an omnidirectional synchronisation pulse is not required.

In particular, the tracking system should be capable of locating a tracked object with an accuracy of no more than 3 mm in each direction, preferably <1 mm. This contrasts with a GPS-based positional tracking system, which is capable of an accuracy in the range of only about 1-5 cm. While such accuracy may be sufficient for outside construction work, it is not suitable for more detailed inside or interior work.

In accordance with the present invention, therefore, the inside-out positional tracking system should have an accuracy that is at least, and preferably better than, ±1 mm.

At the time of writing, a suitable tracking system in accordance with the disclosure of WO 2016/077401 A1 is commercially available from Valve Corporation under the trade name "Lighthouse".

Figure 4:
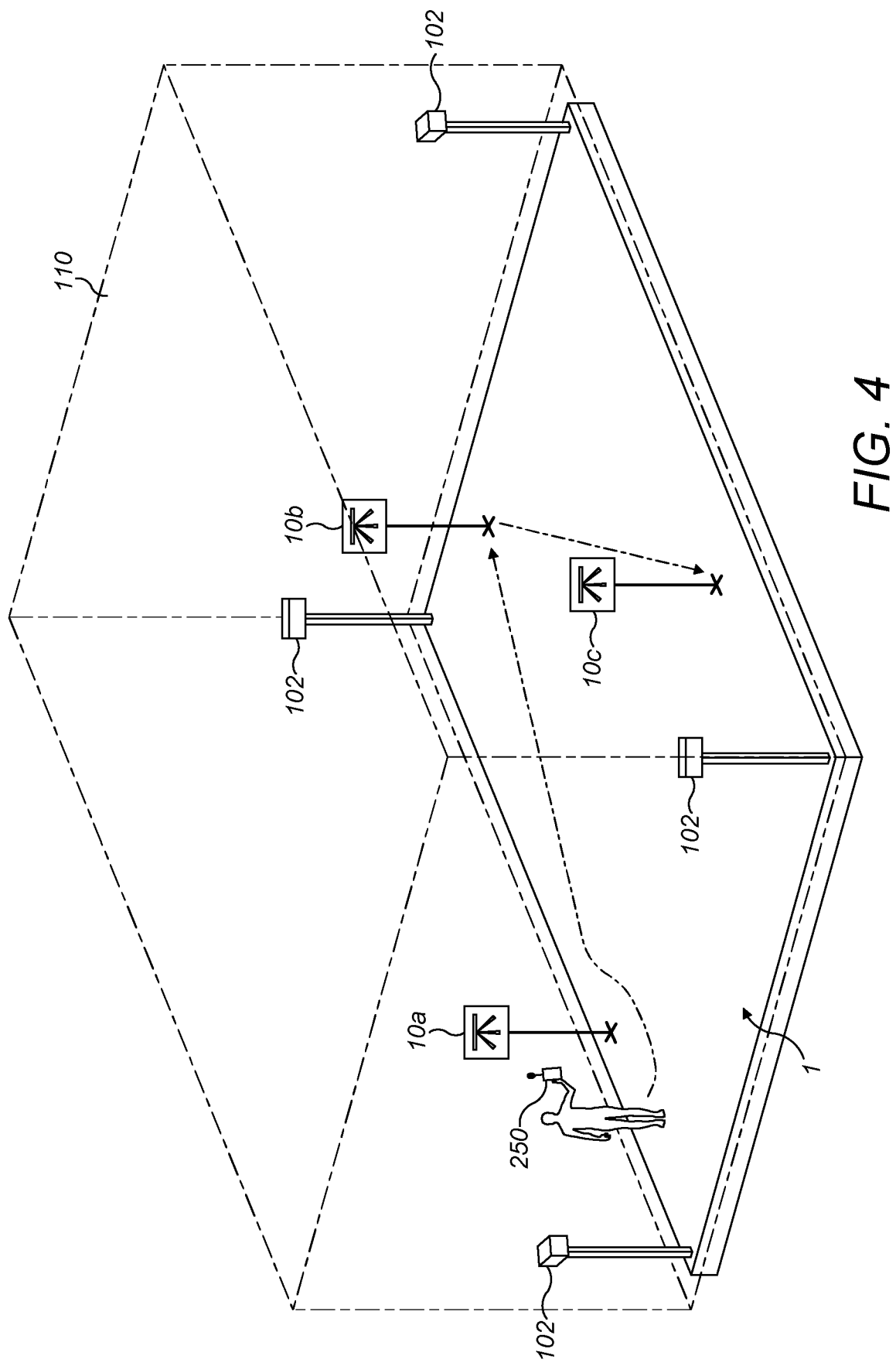
FIG. 4 illustrates schematically a method of calibrating a setting-out tool to an extrinsic real-world coordinate system in accordance with the invention using a plurality of control points of known location within a tracked volume.
Figure 5A:
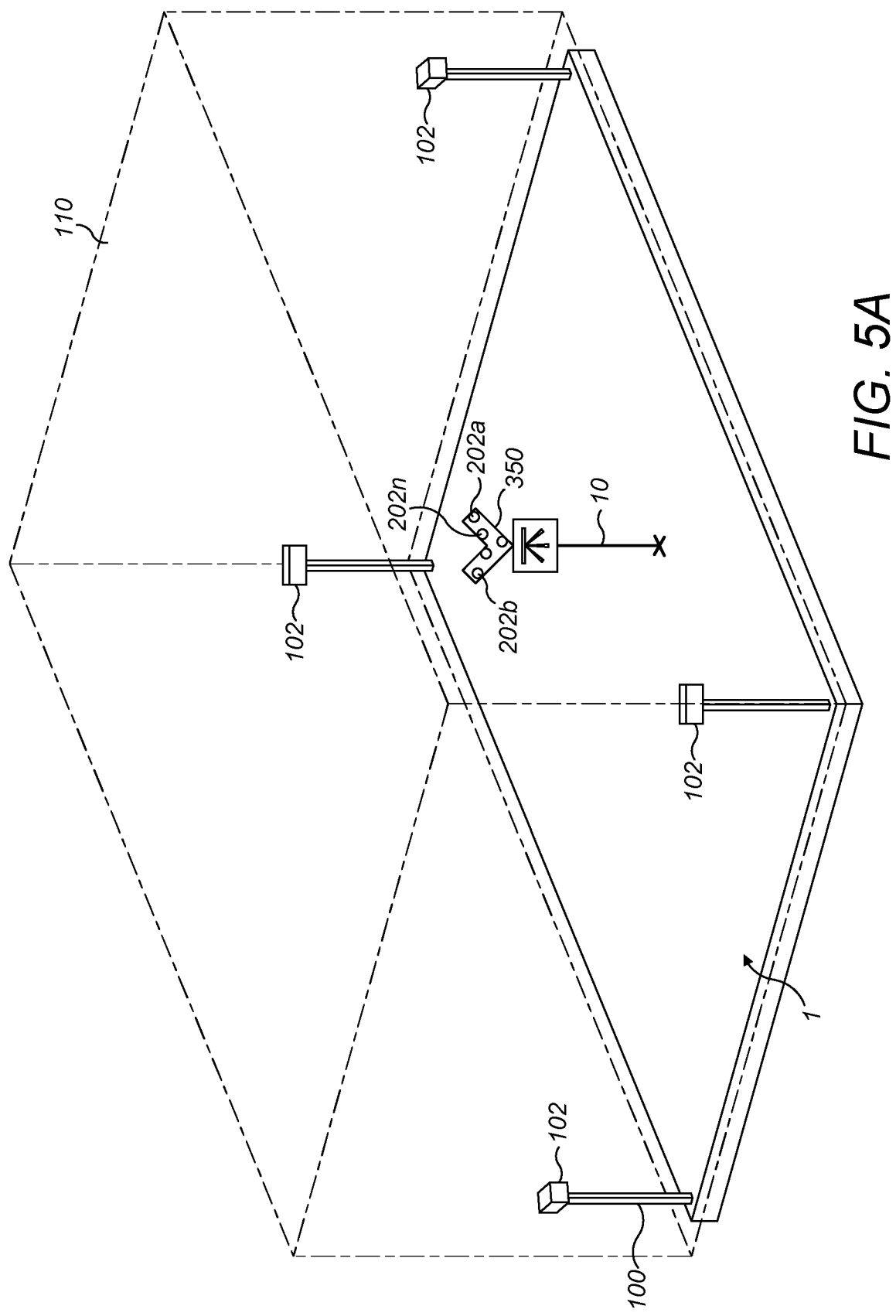
FIG. 5A illustrates schematically an alternative method of calibrating a setting-out tool to an extrinsic real-world coordinate system in accordance with the invention using a single control point of known location and a multi-sensor calibration tool.
Figure 5B:
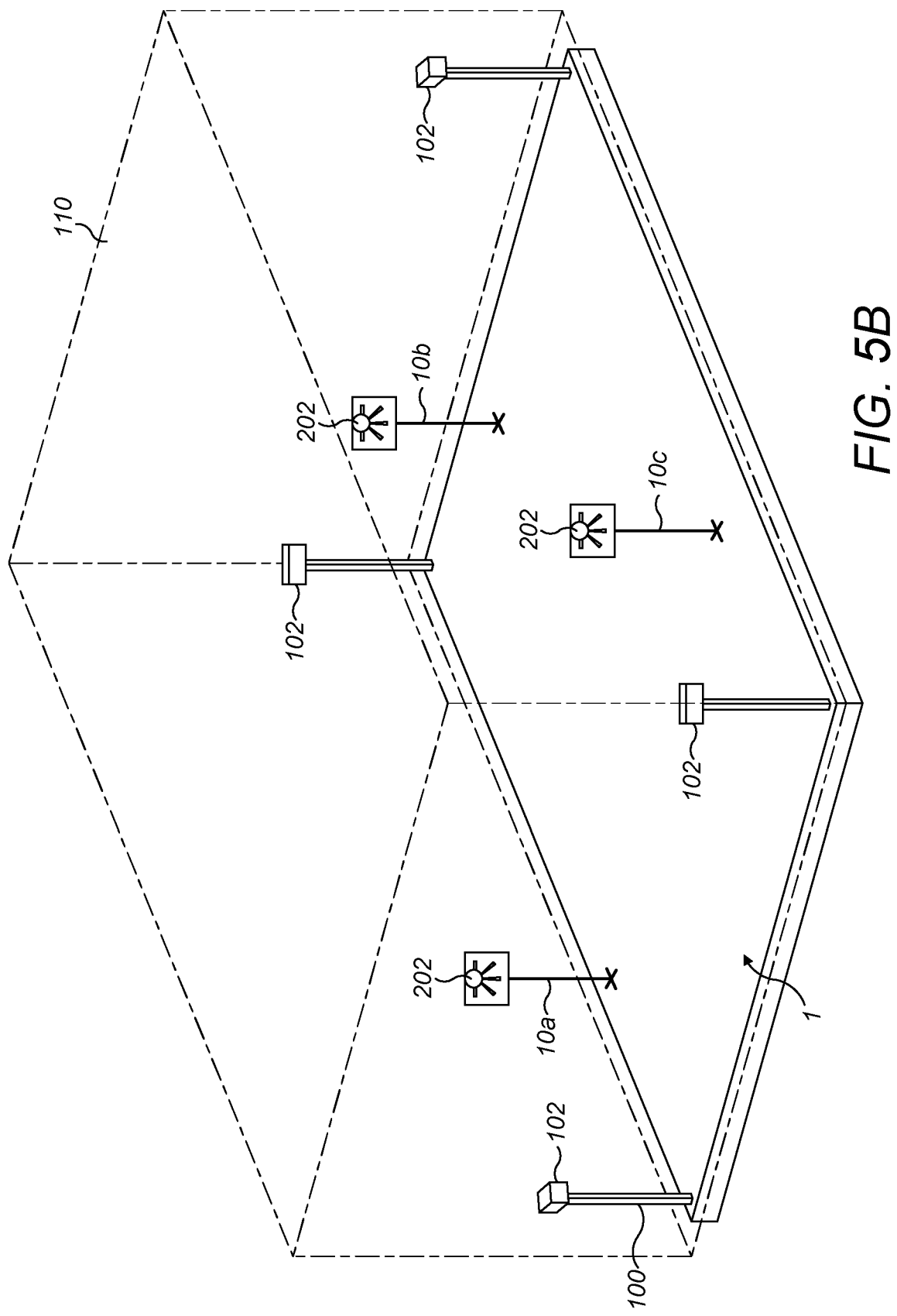
FIG. 5B illustrates schematically a method of calibrating a positional tracking system with an intrinsic coordinate system to an extrinsic real-world coordinate system using a plurality of control points of known location within a tracked volume defined by the tracking system.

In the "Lighthouse" tracking system, each of the two rotors within each base station 102 carries a plurality of infrared laser diodes that emit a beam of laser light. In operation, the rotors rotate 180° out of phase with each other at a frequency of 60 Hz. In other embodiments, one or more beams may be swept at a frequency of 30-90 Hz or 45-75 Hz. Each laser beam is reflected by a mirror within the base station 102 to generate a respective fan-shaped beam 104, 105 that sweeps across the construction site 1. The laser beams 104, 105 emitted by the base stations 102 define a tracked volume 110 at the construction site 1, as best shown in FIGS. 4, 5A and 5B.

The omnidirectional synchronisation pulse is emitted by a plurality of LEDs within each base station 102 at the start of each sweep cycle at a frequency of 120 Hz, to flood the tracked volume 110 with light. For this reason, a wide-angle light source such, for example, as LEDs is preferred for generating the synchronisation pulse.

By sweeping the laser beams 104, 105 across the construction site 1 at an accurate constant angular speed and synchronising the laser beams 104, 105 to an accurately timed synchronisation pulse 103, each base station 102 generates two mutually orthogonal spatially-modulated optical beams 104, 105 in a time-varying manner that can be detected by opto-electronic sensors within the tracked volume 110 for locating the position and/or orientation of one or more tracked objects within the tracked volume 110, as described in more detail below.

Where the positional tracking system 100 comprises two or more base stations 102, the base stations 102 may be synchronised with one another through a wired connection, or wirelessly, to ensure that the omnidirectional synchronisation pulses 103 generated by the respective base stations 102 are emitted at different times, and to ensure that the laser beams 104, 105 emitted by the base stations 102 are swept across the tracked volume 110 out of phase with one another, so that each pulse and each laser beam 104, 105 from each base station 102 may be detected individually by each sensor.

As described in WO 2016/077401 A1, the synchronisation pulses 103 and/or swept laser beams 104, 105 from a plurality of base stations 102 may be differentiated from each other to facilitate disambiguation of the signals from the different base stations 102 and from any other interfering light sources within the tracked volume 110. For instance, the synchronisation pulses 103 and/or swept beams 104, 105 from each base station 102 may have a different optical wavelength or amplitude modulation frequency from the other base station(s) 102, or they may encode base station identification data.

The position and/orientation of an object within the tracked volume 110 can be determined using one or more sensors 202 attached to the object. If the object has only one sensor 202, then two or more base stations 102 are required to define the position of the object within the tracked volume 110. On the other hand, a single base station 102 may be sufficient, if the object is provided with a plurality of sensors 202 and the relative positions of the sensors 202 on the object are known.

Figure 2:
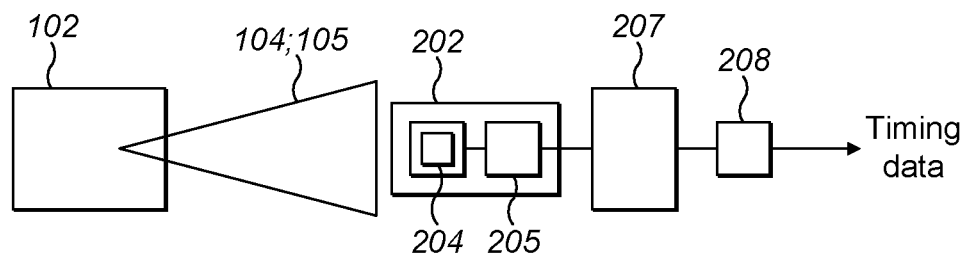
FIG. 2 is a schematic representation of an opto-electronic sensor that is incorporated in a setting-out tool in accordance with the invention.

In the present embodiment, each sensor 202 comprises a silicon photodiode 204 and amplifier/detector circuitry 205, as shown in FIG. 2, but other suitable sensors 202 known to those skilled in the art may be employed, depending on the properties of the omnidirectional synchronisation pulses 103 and spatially modulated light beams 104, 105 that sweep the tracked volume 110.

Each photodiode 204 is connected to a light-to-digital converter 205 which outputs a digital pulse when light from a base station 102 is incident on the photodiode 204. The light-to-digital converter 205 comprises an amplifier, a discrete envelope detector and a fast comparator with a relatively small amount of hysteresis, which delivers a digital pulse whenever a synchronisation pulse 103 is incident on, or light beam 104, 105 from a base station 102 sweeps past, the sensor 202. The digital pulse spans the time the sensor 202 is illuminated by the pulse 103 or beam 104, 105, and the circuit is designed such that the edge positions accurately represent the passage of the pulse or beam, regardless of the orientation of the sensor 202 with respect to the base station 102.

Figure 3:
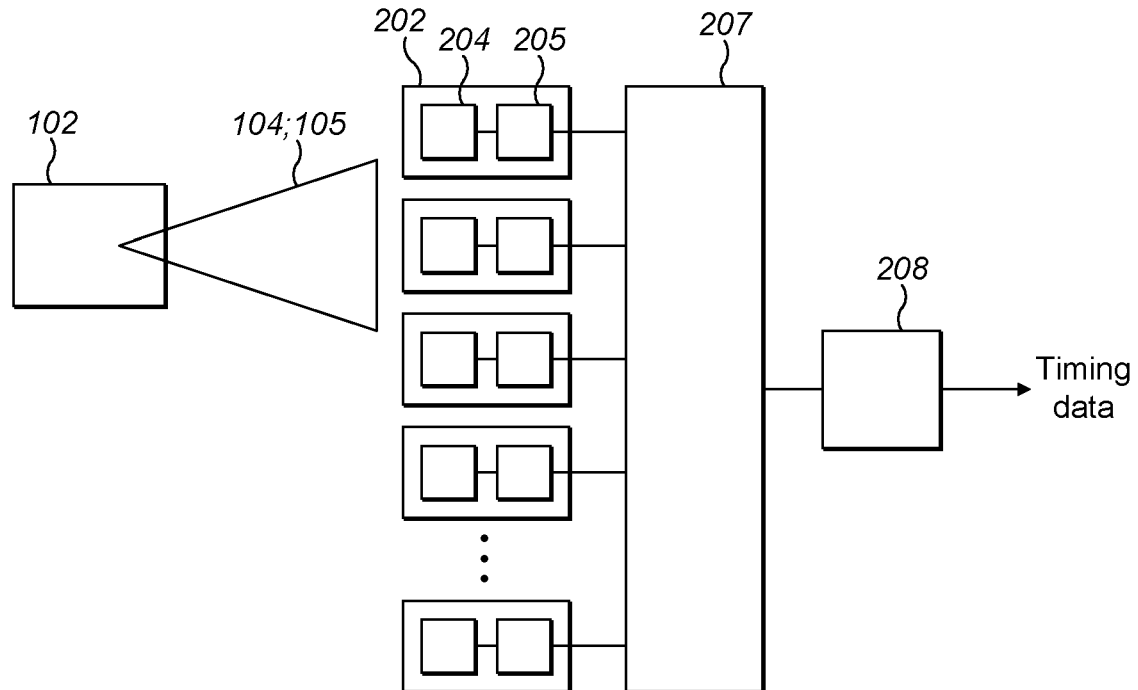
FIG. 3 is a schematic representation of a plurality of opto-electronic sensors for use in a multi-sensor calibration tool in accordance with the present invention.

The digital pulses generated by the light-to-digital converter 205 are time-stamped using a field-programmable gate array (FPGA) 207 and a microcontroller 208 to generate timing data for calculating the position of the sensor 202 in the tracked volume 110 as described below.

Where the tracked object has a plurality of sensors 202, the digital pulses received from all of the sensors 202 are received, time-stamped and aggregated by a single FPGA 207, as illustrated in FIG. 3.

In embodiments in which bearing data is encoded within each beam 104, 105, as described above, the light-to-digital converter 205 may further comprise a data output for outputting the bearing data demodulated from the beam.

The inside-out positional tracking system used in the present embodiment therefore comprises a plurality of base stations 102 and at least one sensor 202 on an object to be tracked within the tracked volume 110 defined by the swept laser beams 104, 105 emitted by the base stations 102.

From the elapsed time between the omnidirectional synchronisation pulse 103 issued by a base station 102 and the time one of the beams 104, 105 from a base station 102 passes a sensor 202, as represented by the timing data output by the FPGA 207, it is possible to calculate an angular distance between the base station 102 and sensor 202. From the angular distances between the sensor 202 and two or more base stations 102, it is possible to triangulate the position of the sensor 202 relative to the base stations 102. By calculating the angular distances between the sensor 202 and the two or more base stations 102 in the orthogonal planes defined by the swept beams 104, 105 emitted by each base station 102, it is possible to determine the position of the sensor 202 relative to the base stations 102 in three dimensions.

In this way, it will be understood that the inside-out positional tracking system 100 defines an intrinsic coordinate system by which the location of any tracked object within the tracked volume 110 can be defined.

As mentioned above, in an embodiment in which a tracked object has multiple sensors 202, positioning of the object within the tracked volume 110 can be achieved using only one base station 102, provided the relative positions of the multiple sensors 202 on the object are known, by triangulating the angular distances between each of the sensors 202 and the one base station 102.

Calibrating the Positional Tracking System to Real-World Coordinates

A key aspect of the present invention comprehends relating the intrinsic coordinate system defined by the positional tracking system 100 to extrinsic, real-world (site) coordinates. As mentioned above, the positions of the control points 10a, 10b, 10c are known in a real-world coordinate system. The tracking system 100 may therefore be calibrated to the extrinsic coordinate system in accordance with one embodiment of the present invention by manually moving a calibration tool 250 comprising a single sensor 202, as shown in FIG. 1, to each control point 10a, 10b, 10c in turn, as illustrated in FIG. 4, and determining the locations of the control points 10a, 10b, 10c in the intrinsic coordinate system defined by the positional tracking system 100. Once the locations of the control points 10a, 10b, 10c are known in both the intrinsic and extrinsic real-world coordinates systems, a mathematical transformation can be derived for converting coordinates in the intrinsic coordinate system of the tracking system 100 into coordinates in the extrinsic real-world coordinates system or vice versa.

Suitably, these calibration steps may be carried out using a computer (not shown) that is programmed with calibration software in accordance with the present invention. When executed, the calibration software operates the computer to receive control point location data representing the positions of the control points 10a, 10b, 10c in the extrinsic, real-world coordinate system, receiving control point tracking data representing the positions of the control points in the intrinsic coordinate system defined by the positional tracking system 100 based on the timing data from the sensor 202 on the calibration tool 250 when positioned at each control point 10a, 10b, 10c in turn, and relating the positions of the control points 10a, 10b, 10c in the intrinsic and extrinsic coordinate systems to produce a transformation between the coordinate systems.

The calibration software may therefore comprise machine code that is executable by the computer to receive and process the timing data representing the time when the sensor 202, when located at each control point 10a, 10b, 10c, responds to the spatially modulated beams of light 104, 105 from the base stations 102 at the construction site 1 to calculate the positions of the control points 10a, 10b, 10c in the intrinsic coordinate system.

FIG. 5A illustrates an alternative method of calibrating the tracking system 100 to real-world coordinates in accordance with a different embodiment of the invention.

In FIG. 5A, a single control point 10 is situated at a known point on the construction site 1. As described above, the location of the control point 10 in real-world coordinates may be determined by a site engineer using a total station and triangulating from two or more points of known location at or adjacent the construction site 1 in the conventional way.

A multiple-sensor calibration tool 350, which is equipped with a plurality of sensors 202a, 202b, 202c . . . 202n, is placed at the control point 10. An example of a multiple sensor calibration is illustrated schematically in FIG. 6. As can be seen, the multiple sensor calibration tool 350 comprises a body 370 comprising a handle portion 371, an intermediate portion 372, which is angled to the handle portion 371, and a mounting portion 374 which comprises a flat end surface 375 and is formed with one or more holes 380 extending therethrough for attaching the calibration tool 350 to an object at the control point 10.

Figure 6:
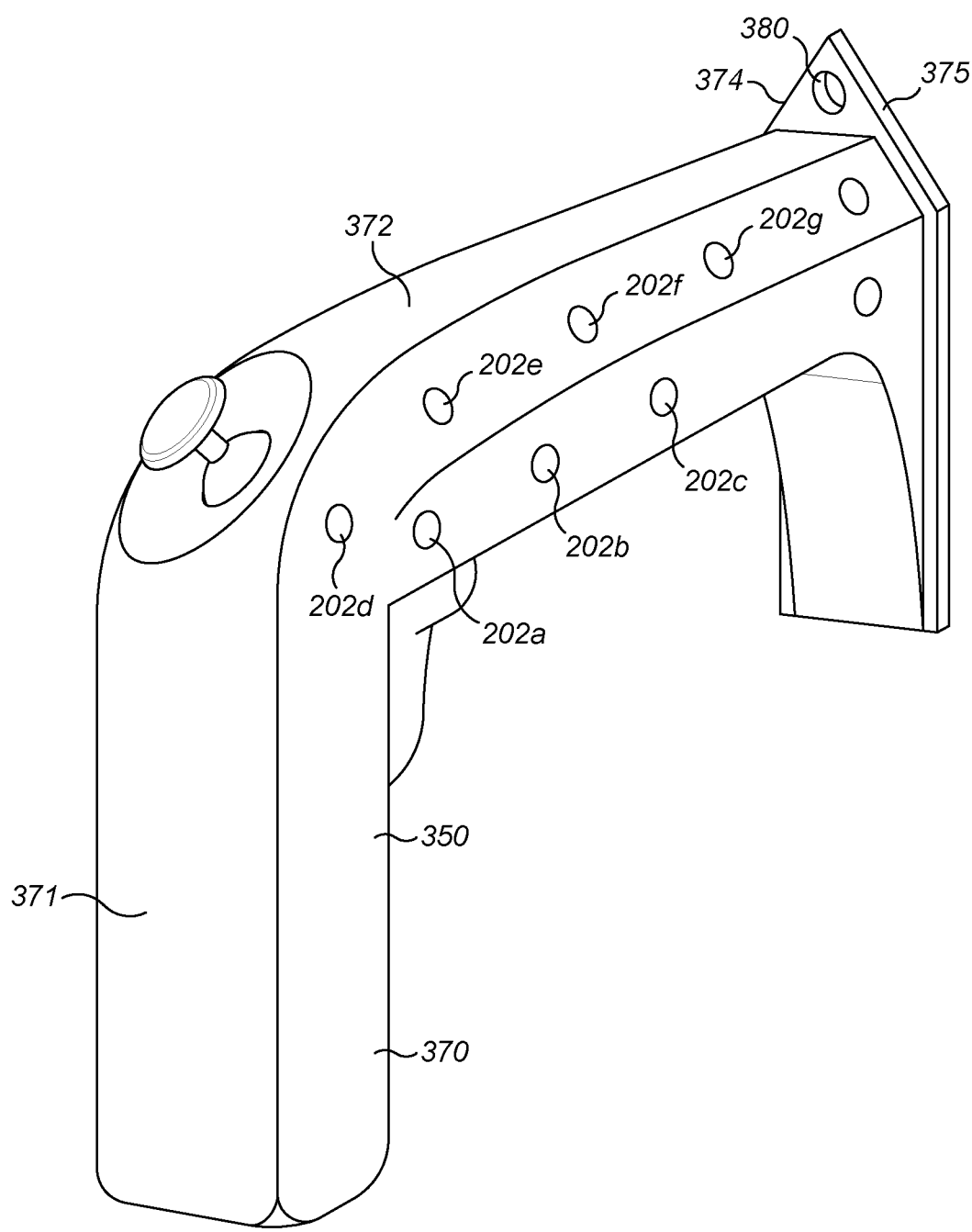
FIG. 6 illustrates schematically a multi-sensor calibration tool for use in calibrating a positional tracking system in accordance with the invention.

As can be seen in FIG. 6, the sensors 202a, 202b, 202c . . . 202n are provided at spaced locations on the intermediate portion 372 of the tool 350. The relative positions of the sensors 202a, 202b, 202c . . . 202n are known. As described above, the position and orientation of the multiple-sensor calibration tool 350 within the tracked volume 110 can be calculated from the timing data generated by the multiple sensors 202a, 202b, 202c . . . 202n. From the position and orientation of the calibration tool 350 within the tracked volume 110, the known relative dispositions of the sensors 202a, 202b, 202c . . . 202n on the calibration tool 350, and the known location of the control point 10 in the extrinsic real-world coordinates, a transformation between the extrinsic real-world coordinate system and the intrinsic coordinate system can be calculated.

Yet another calibration method for producing a transformation between the real-world coordinate system at the construction site 1 and the intrinsic coordinate system defined by the positional tracking system 100 is illustrated in FIG. 5B.

In FIG. 5B, there are three control points 10a, 10b, 10c of known location at the construction site 1 in the same way as shown in FIGS. 1 and 4 described above. The positions of the control points 10a, 10b, 10c in the extrinsic, real-world coordinates are known using conventional surveying techniques, as described above.

Unlike the embodiments described with reference to FIGS. 4 and 5A, however, in FIG. 5B, a sensor 202 is positioned permanently at each control point 10a, 10b, 10c. The position of the sensors 202 at the control points 10a, 10b, 10c in the intrinsic coordinate system defined by the positional tracking system 100 can be calculated, as described above, using the timing data generated by the sensors 202 at each control point representing when each sensor 202 responds to the synchronisation pulses 103 and orthogonal swept beams 104, 105 emitted by each base station 102, to calculate the angular distance from each sensor 202 to each base station 102 and triangulating the position of each sensor 202 from its angular distance to each base station 102. Once the positions of the sensors 202 at the control points 10a, 10b, 10c are known in both the intrinsic coordinate system and the extrinsic real-world coordinates system, a suitable mathematical transformation between the two coordinate systems can be deduced.

An advantage of the calibration method illustrated in FIG. 5B is that the sensors 202 can be left permanently at each control point 10a, 10b, 10c, and the calibration between the intrinsic and extrinsic coordinates systems can be periodically refreshed.

Setting-Out Tool

Figure 7:
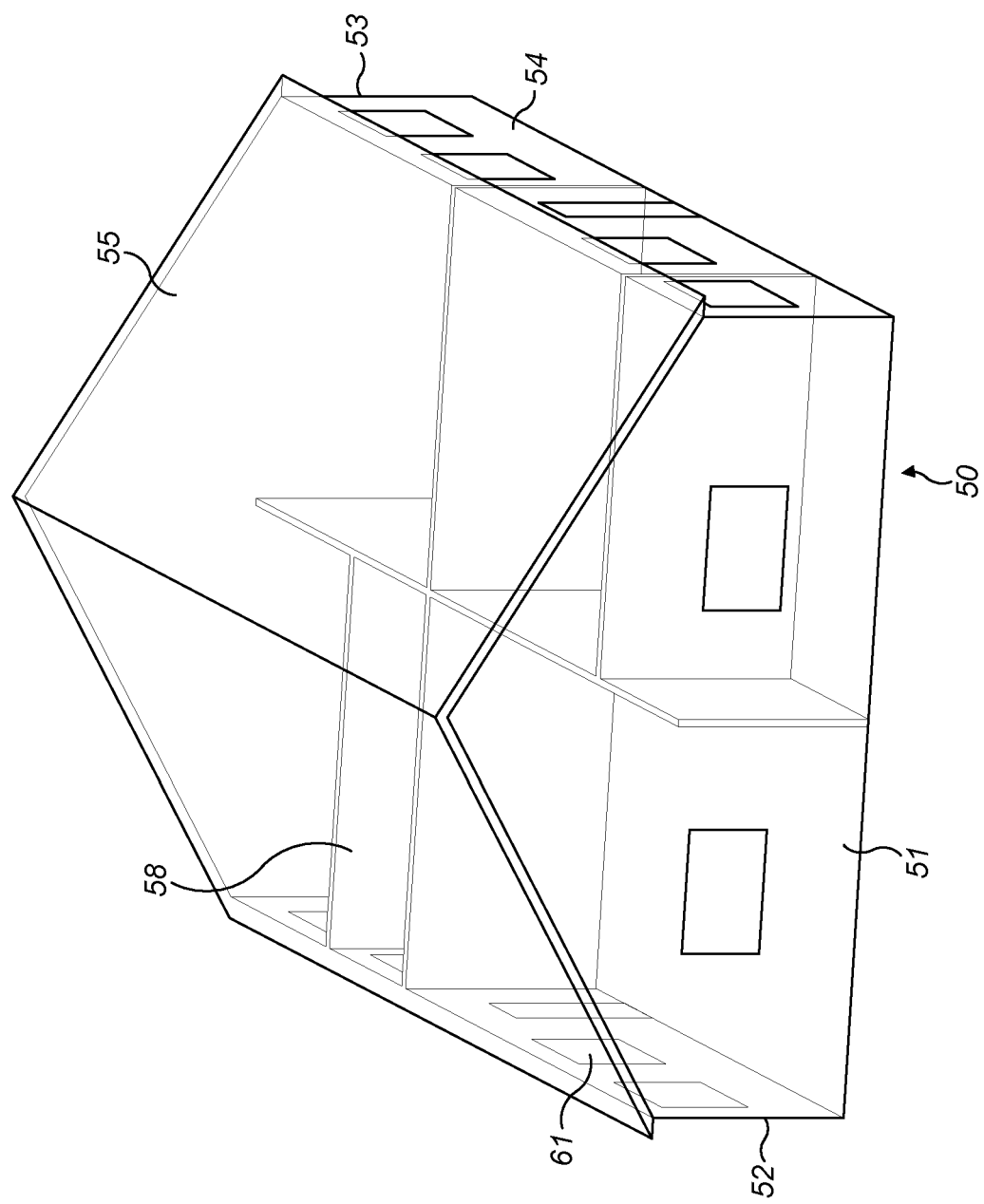
FIG. 7 is a schematic illustration of a typical building information model (BIM model).

A building information model (BIM) is conventionally laid out using real-world (site) coordinates, which are typically expressed using a geographic coordinate system, as mentioned above. FIG. 7 illustrates, purely by way of example, a three-dimensional BIM model for a building 50 to be constructed at the construction site 1. The building 50 has exterior walls 51, 52, 53, 54, a roof 55 and interior partitions, one of which is shown at 58. One of the walls 52 is designed to include a window 61.

When setting out a construction site 1, it is necessary to interpret construction drawings, which are prepared in two dimensions from a 3-D BIM model, in relation to the construction site 1, so that various tasks indicated on the construction drawings are carried out at the correct location at the construction site 1. Task should be carried out at the correct location as accurately as possible to comply with applicable regulations and/or permissions, to ensure that tasks are carried out as intended, and to ensure that tasks are carried out at the correct location in relation to other tasks. As discussed above, errors or mistakes in carrying out a construction task at the correct location may lead to delays in completing tasks according to the construction drawings and possibly extra costs.

Figure 8:
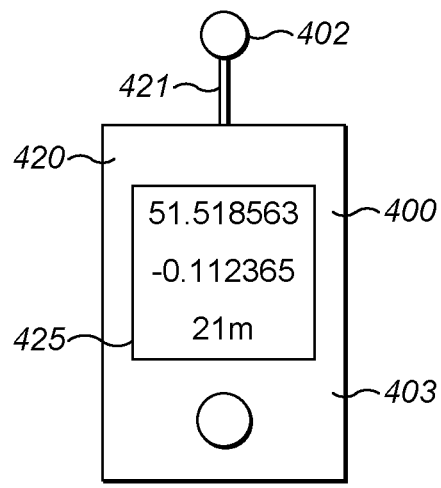
FIG. 8 is a schematic illustration of a portable setting-out tool in accordance with the invention.
Figure 9:
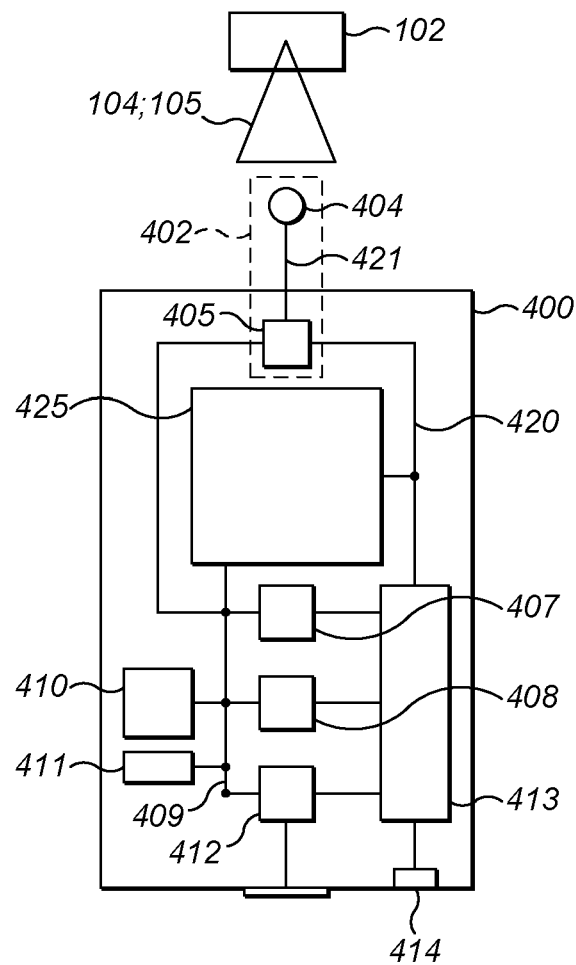
FIG. 9 shows schematically electronic components of the portable setting-out tool of FIG. 8.

In accordance with the present invention, the construction site 1 can be set out using a portable handheld setting-out tool 400 of the kind illustrated in FIGS. 8 and 9, which comprises a single opto-electronic sensor 402 positioned at the tip of a probe 421 mounted to a housing 401. A flat panel display 425 is set into a front wall 403 of the housing 420 for displaying the position of the sensor 402 as described below. The sensor 402 comprises a single photodiode 404 and a light-to-digital converter 405 of the kind described above.

As illustrated in FIG. 9, the light-to-digital converter 405 is connected to an FPGA 407 controlled by a processor 408 for time-stamping digital pulses received from the converter 406. The FPGA 407, processor 408 and display 425 are connected to a local bus 409, which also connects to a memory device 410, a storage device 411 and a data input/output device 412 such, for example, as a USB port. The various electronic components of the setting-out tool 400 are powered by a rechargeable battery 413 having a power connector 414 for connecting to a power supply for recharging the battery 413 as needed.

The storage device 411 includes machine-executable code for operating the setting-out tool 400. When the tool 400 is operated, the machine executable code is executable by the processor 408 to provide a calibration mode and a setting-out mode of use.

Calibration Mode

In the calibration mode, the setting-out tool 400 operates in a similar manner to the calibration tool 250 described above in relation to FIG. 4. That is to say, the setting-out tool, in calibration mode, may be moved sequentially to control points 10a, 10b, 10c of known locations in real-world coordinates at the construction site 1 to locate the control points 10a, 10b, 10c in the intrinsic coordinate system defined by the positional tracking system 100 and derive a mathematical transformation between the two coordinate systems, which can then be stored in the storage device 411 of the setting-out tool 400 for use by the tool 400 in its setting-out mode as described below.

Figure 10:
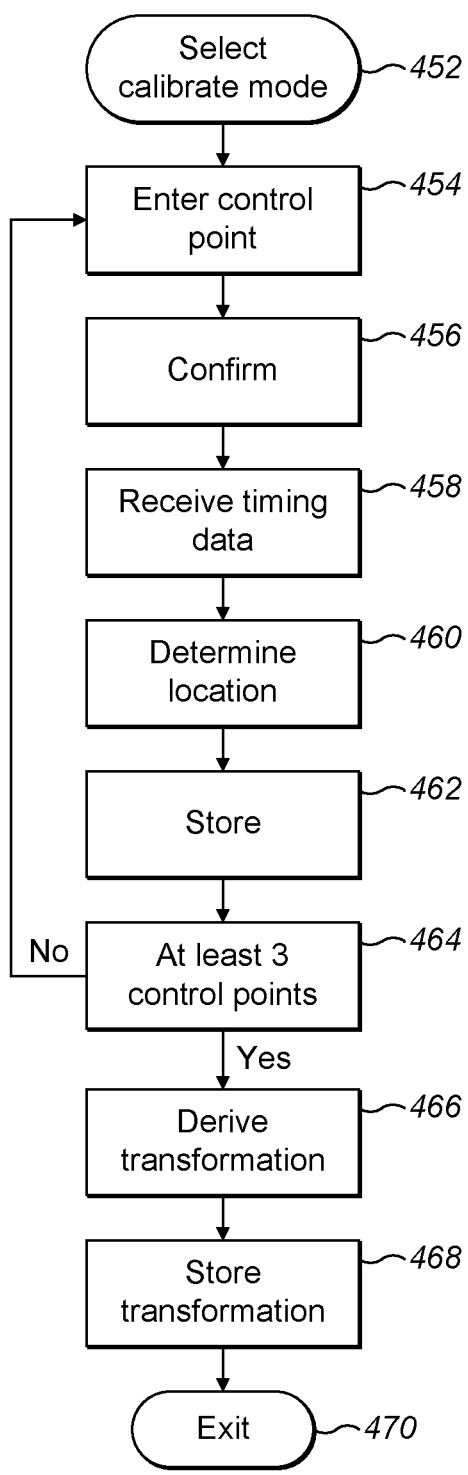
FIG. 10 is a flowchart representing operation of the portable setting-out tool of FIGS. 8 and 9 in a calibration mode.

FIG. 10 shows a sequence of operations performed by the microcontroller 408 in the calibration mode. The person skilled in the art will be familiar with numerous computer languages which may be used to write a computer program which may be compiled to generate the machine executable code for carrying out these operations.

After switching on the setting-out tool 400, the user is prompted to select calibration mode or setting-out mode at step 452. Upon initiating calibration mode, the machine operable code next prompts the user to enter at step 454 the coordinates in a real world, geographic coordinate system for a first control point 10a of known location at the construction site, as indicated in FIG. 4. The user then moves to the first control point 10a and places the sensor 402 at the tip of the probe of the setting-out tool 400 precisely at the first control point 10a, and operates the setting-out tool 400 at step 456 to indicate that the sensor 402 is correctly positioned at the first control point 10a.

The sensor 402 detects the omnidirectional synchronisation pulses 103 emitted by the base stations 102 and the swept orthogonal beams 104, 105, and the light-to-digital converter 405 generates corresponding digital pulses which are time stamped by the FPGA 407 within the tool 400 at step 458.

Based on the timing data from the FPGA, at step 460, the microcontroller 408 determines the location of the sensor 402 in the intrinsic coordinate system defined by the tracking system 100. The location of the first control point 10a in the intrinsic coordinate system is stored in the storage device 411 at step 462.

At step 464, the microcontroller 408 checks whether the locations of at least three control points have been obtained. If the locations of fewer than three control points have been obtained, steps 454-462 are repeated until the locations of at least three control points in the intrinsic and extrinsic coordinate systems have been saved in the storage device 411. In the present embodiment, the locations of at least three control points are required, but in some alternative embodiments, only two control points may suffice, in which case steps 454-462 are repeated until the locations of at least two control points in the intrinsic and extrinsic coordinate systems have been saved in the storage device 411.

In step 466, the positions of the control points in the intrinsic coordinate system are related to the corresponding positions of the control points in the extrinsic real-world coordinates system, and a mathematical transformation between the two coordinate systems is derived, which is then stored in the storage device 411 at step 468. The tool 400 then exits calibration mode (step 470).

Setting-Out Mode

Figure 11:
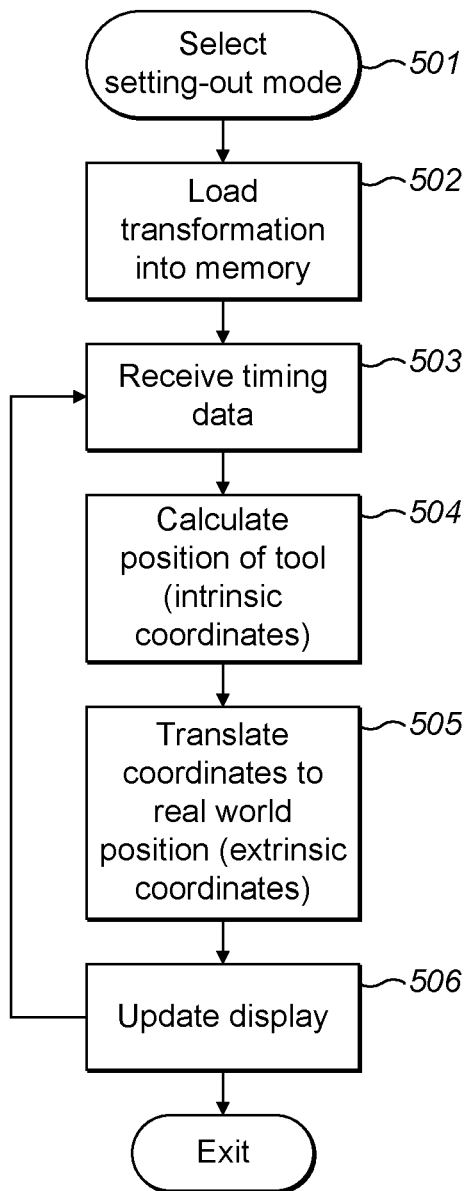
FIG. 11 is a flowchart representing operation of the portable setting-out tool of FIGS. 8 and 9 in a setting-out mode.

Upon entering setting-out mode in step 501, as illustrated in FIG. 11, the microcontroller 408 first loads the mathematical transformation calculated in calibration mode, as described above, from the storage device 411 into the memory 410 (step 502).

The microcontroller 408 is then operated in a continuous "listening" mode in which timing data received from the FPGA 407 (step 503), as described above, is continually processed to determine the position of the tool 400 within the tracked volume 110 in the intrinsic coordinate system defined by the positional tracking system 100 (step 504).

Using the transformation, the position of the tool 400—or more accurately the position of the photodiode 404 at the tip of the tool's probe—within the tracked volume 110 at the construction site 1 in the intrinsic coordinate system is translated into the extrinsic, real-world coordinate system (step 505).

The machine code controls the microcontroller 408 to display in real-time the position of the tool 400 in the real-world coordinate system on the flat panel display 425 (step 506).

It will be appreciated that a user can use the setting-out tool 400 in accordance with the present embodiment of the invention to set out a construction site 1 by locating reference points and/or placing markers at locations at the construction site 1 in accordance with the construction drawings, whose positions are known accurately in real-world coordinates from the tool 400. In this way, reference points marked on the construction drawings can be located in the real world at the construction site 1 without having to call a site engineer to the construction site 1 to locate the reference points, or place markers, using a total station.

Hard Hat with Augmented Reality Display

Figure 12:
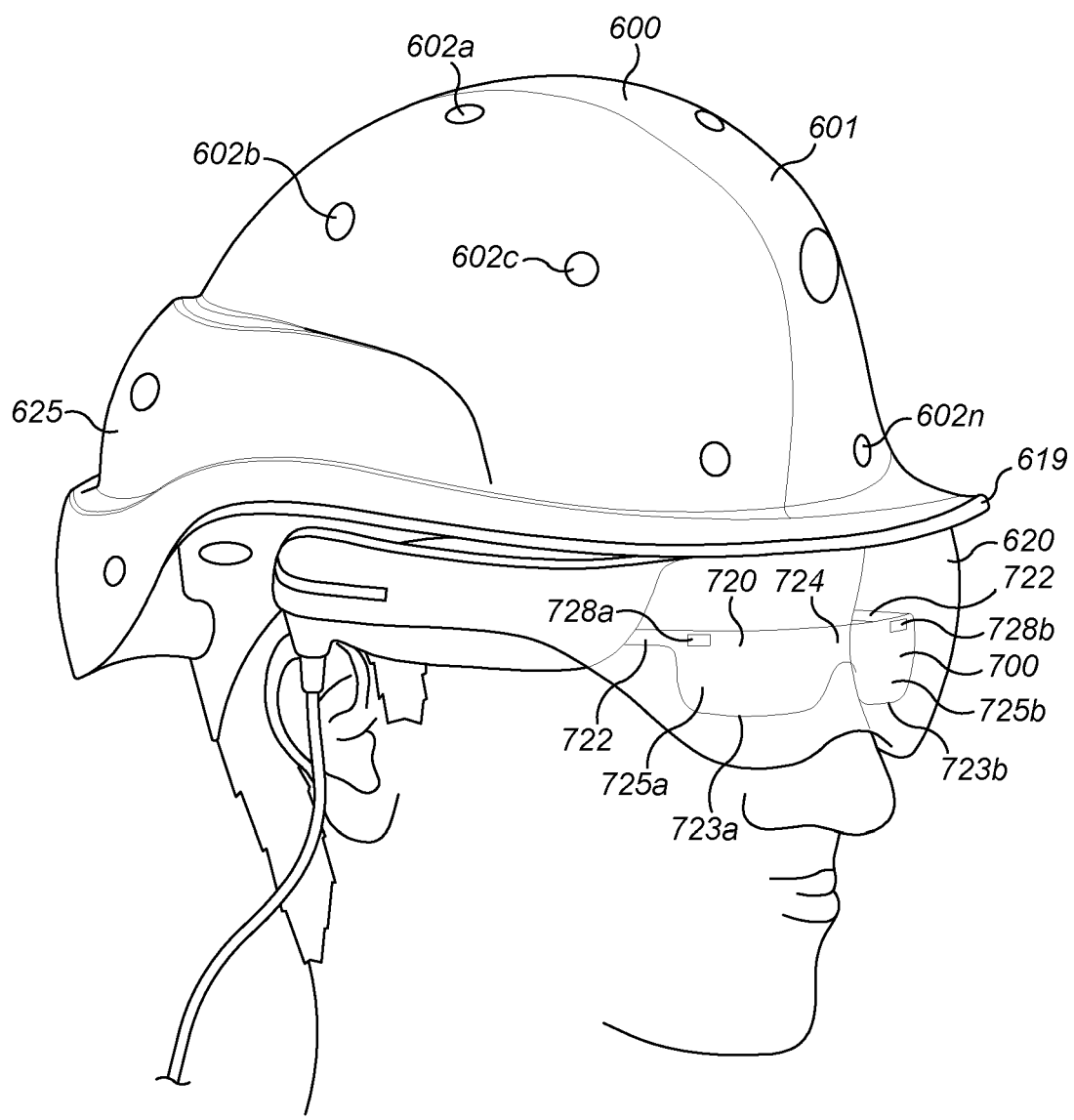
FIG. 12 is a schematic illustration in perspective from above and to one side of a hard hat incorporating an augmented reality display in accordance with the present invention.

In another embodiment, the present invention provides a setting-out tool for a construction site which comprises a hard hat 600 and augmented reality glasses 700, as shown in FIG. 12.

The hard hat 600 comprises a construction helmet 601 of essentially conventional construction which is fitted with a plurality of sensors 602a, 602b, 602c . . . 602n and associated electronic circuitry, as described in more detail below, for tracking the position of the hard hat 600 within a tracked volume 110 defined by an inside-out positional tracking system 100 that is set up at a construction site 1, as described above in relation to FIG. 1.

In the present embodiment, the helmet 601 is equipped with 32 sensors 602a, 602b, 602c . . . 602n where n=32, but it will be appreciated that the number of sensors may be varied in accordance with the invention. Suitably, the helmet 601 may have between 20 and 32 sensors distributed over the outer surface of the helmet 601, but at least 5 sensors are required to track the position and orientation of the hard hat 600.

Figure 13:
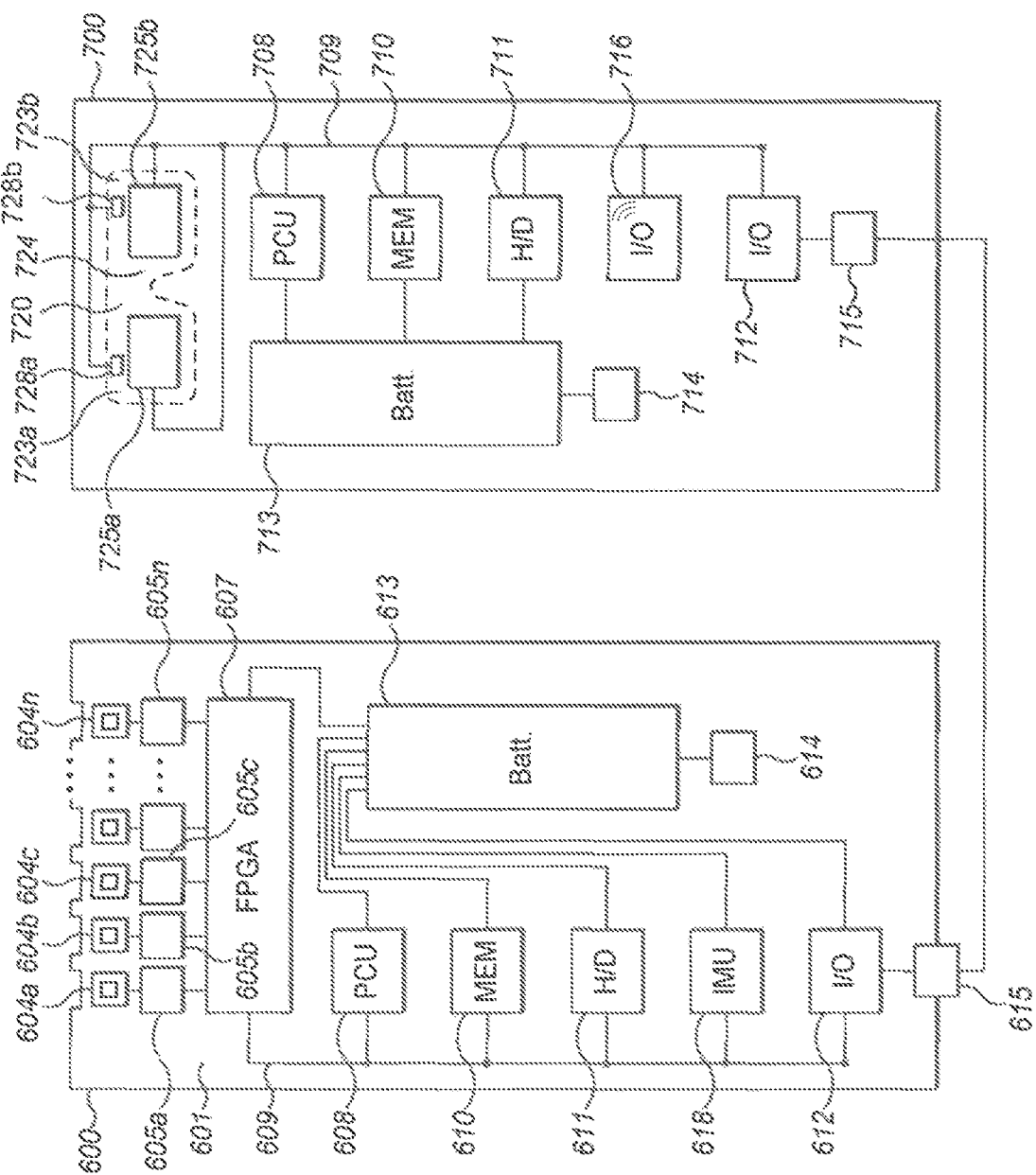
FIG. 13 illustrates electronic components of the hard hat of FIG. 12 including a tracking module and an augmented reality display module.

As best illustrated in FIG. 13, each sensor 602a, 602b, 602c . . . 602n comprises a photodiode 604a, 604b, 604c . . . 604n that is sensitive to infrared light and an associated light-to-digital converter 605a, 605b, 605c . . . 605n of the kind described above in relation to FIGS. 2, 3 and 9. Suitably, the photodiodes 604a, 604b, 604c . . . 604n are positioned within recesses formed in the outer surface of the helmet 601 to avoid damage to the photodiodes.

Digital pulses received from the light-to-digital converters 605a, 605b, 605c . . . 605n are time-stamped and aggregated by an FPGA 607, which is connected to a processor 608 by a local data bus 609. The local bus 609 also connects to a memory device 610, a storage device 611, an input/output device 612 having a dock connector 615 such, for example, as a USB port, and an inertial measurement unit (IMU) 618 of the kind found in virtual reality and augmented reality headsets, which comprises a combination of one or more accelerometers and one or more gyroscopes. A typical IMU comprises one accelerometer and one gyroscope for each of pitch, roll and yaw modes.

The electronic components of the hard hat 600 are powered by a rechargeable battery unit 613. A power connector socket 614 is provided for connecting the battery unit 613 to a power supply for recharging.

Suitably, the electronic components of the hard hat 600 are accommodated within a protected cavity 625 formed in the helmet 601.

As described above, the hard hat 600 may have suspension bands inside the helmet 601 to spread the weight of the hard hat 600 as well as the force of any impact over the top of the head. As illustrated in FIG. 12, the helmet 601 comprises a protruding brim 619 and may optionally be fitted with ear protectors, mirrors for increased rear field-of-view, a mounting for a headlamp or flashlight, a chinstrap to keep the helmet 601 from falling off, insulating side pads to keep sides of the head warm and/or bands stretched around the brim 619 for colour worker identification and/or high visibility night retro-reflectivity.

Advantageously, in the present embodiment, the helmet comprises safety goggles 620, which serve not only to protect the user's eyes on the construction site 1, but also serve to protect the augmented reality glasses 700, which are mounted inside the goggles 620. As illustrated in FIG. 12, the goggles 620 are mounted to the helmet 601 such that they are recessed slightly behind the brim 619 to afford a degree of protection for the goggles 620. It will be understood that in embodiments where the augmented reality glasses 700 themselves are ruggedised and ready for construction, the safety goggles 620 may be omitted. In other embodiments, the helmet 601 may comprise a safety visor.

The augmented reality glasses 700 comprise a shaped transparent (optically clear) plate 720 that is mounted between two temple arms 722, as shown in FIG. 12. In the present embodiment, the augmented reality glasses 700 are attached to the hard hat 600 such that they are fixedly secured in an "in-use" position as shown in FIG. 12 relative to the sensors 602a, 602b, 602c . . . 602n and are positioned behind the safety goggles 620 as described above. The augmented reality glasses 700 may, in some embodiments, be detachable from the hard hat 600, or they may be selectively movable, for example by means of a hinge between the hard hat 600 and the temple arms 722, from the in-use position to a "not-in-use" position (not shown) in which they are removed from in front of the user's eyes.

In the present embodiment, the transparent plate 720 is arranged to be positioned in front of the user's eyes and comprises two eye regions 723a, 723b, which are arranged to be disposed in front of the user's right and left eyes respectively, and an interconnecting bridge region 724.

Attached to, or incorporated in, each of the eye regions 723a, 723b is a respective transparent or semi-transparent display device 725a, 725b for displaying augmented reality media content to a user as described below, whilst allowing the user to view his or her real-world surroundings through the glasses 700. The augmented reality glasses 700 also comprise lenses (not shown) positioned behind each display device 725a, 725b for viewing an image displayed by each display device 725a, 725b. In some embodiments, the lenses may be collimating lenses such that an image displayed by each display device 725a, 725b appears to the user to be located at infinity In some embodiments, the lenses may be configured to cause rays of light emitted by the display devices 725a, 725b to diverge, such that an image displayed by each display device 725a, 725b appears at a focal distance in front of the augmented reality glasses 700 that is closer than infinity In the present embodiment, the lenses are configured and arranged with the display devices 725a, 725b such that images displayed by the display devices 725a, 725b appear to be located at a focal distance of 8 m in front of the user.

Within each eye region 723a, 723b, the transparent plate 720 carries a respective eye-tracking device 728a, 728b for tracking the position of the user's eyes when the hard hat 600 is worn. In particular, each of the eye-tracking devices 728a, 728b is configured to detect the position of the centre of the pupil of a respective one of the user's eyes for the purpose of detecting movement of the augmented reality glasses 700 relative to the user's eyes in use and to generate and output display position data relating the position of the augmented reality glasses 700 relative to the user's head. Those skilled in the art will be aware of numerous other solutions for tracking the position of the augmented reality glasses 700 relative to the user's head in use, including optical sensors of the kind disclosed by U.S. Pat. No. 9,754,415 B2 and a position obtaining unit of the kind disclosed by US 2013/0235169 A1. Monitoring movement of the augmented reality glasses 700 relative to the user's head is important, because the hard hat 600 may move relative to the user's head in use, particularly when the user is carrying out physical activities. The hard hat 600 may slip on the user's head as a result of vibrations, impulses or any other kind of movement by the user. In the present embodiment, two eye-tracking devices 728a, 728b are provided, one associated with each of the user's eyes, but in other embodiments, a single eye-tracking device may be employed associated with one of the eyes.

With reference to FIG. 13, the transparent display devices 725a, 725b and eye-tracking devices 728a, 728b are connected to a local data bus 709 for interconnection with a processor 708, a memory unit 710, a storage device 711, an input/output device 712 with a dock connector 715 and a Wi-Fi microcontroller 716. Power for the electronic components is provided by a rechargeable battery unit 713, which is connected to a power connector socket 714 for connecting the battery unit 713 to a power supply for recharging. In other embodiments, a single power connector socket may be provided for both the hard hat 600 and the glasses 700, and in some embodiments, a single rechargeable battery unit may be provided for powering the position tracking circuitry and the augmented reality display circuitry.

The dock connector 615 on the hard hat 600 is connected to the dock connector 715 of the glasses 700 for providing tracking data from the hard hat 600 to the glasses 700.

The storage device 611 of the hard hat 600 contains computer-executable machine code that can be processed by the processor 608 for controlling the operation of the hard hat 600. As with the portable setting-out tool 400 described above, those skilled in the art will be familiar with numerous computer programming languages that may be employed for writing software which can be compiled to generate the machine code, which causes the hard hat 600 to operate in accordance with the flowchart of FIG. 14.

Figure 14:
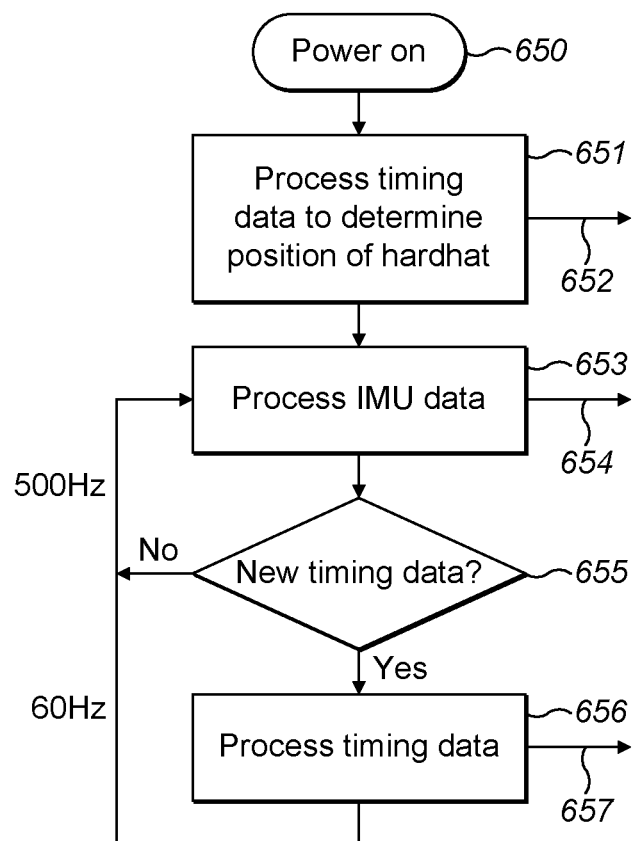
FIG. 14 is a flowchart representing operation of the tracking module of the hard hat of FIGS. 12 and 13.

Upon powering up the hard hat 600 in step 650 of FIG. 14, the processor 608 accesses the storage device 611 to load the machine code into the memory unit 610 for execution by the processor 608. Aggregated, time-stamped digital pulses outputted by the FPGA 607 are received and processed by the processor 608 in accordance with the machine code in step 651 to determine the initial position and orientation of the hard hat 600 in relation to one or more base stations 102 at the construction site 1 that emit omnidirectional infrared synchronisation pulses 103 and sweep orthogonal beams of infrared light 104, 105 across the construction site 1, as described above in relation to FIGS. 1-11.

The photodiodes 604a, 604b, 604c . . . 604n on the surface of the helmet 601 respond to the synchronisation pulses 103 and swept beams 104, 105, and the digital pulses generated by the light-to-digital converters 605a, 605b, 605c . . . 605n are time stamped and aggregated by the FPGA 607. The elapsed time between the synchronisation pulses 103 emitted by one of the base stations 102 and the time the swept beams 104, 105 from the one base station that are incident upon one of the photodiodes 604a, 604b, 604c . . . 604n can be used to determine the angular distance of the one photodiode to the one base station 102. The position of the one photodiode 604a, 604b, 604c . . . 604n within the tracked volume 110 created by the swept beams 104, 105 from the base stations 102 can be calculated in an intrinsic coordinate system defined by the tracking system by triangulating the angular distances of the one photodiode to multiple base stations 102, as described above. The orientation of the hard hat 600 can be calculated from the positions of all the photodiodes 604a, 604b, 604c . . . 604n relative to the base stations 102.

Tracking data representing the initial position and orientation of the hard hat 600 is output from the hard hat 600 via the input/output device 612 at the docking connector 615, as indicated in FIG. 14 by reference numeral 652, and is transmitted to the augmented reality glasses 700 as described below Subsequent position tracking of the hard hat 600 is carried out primarily using the IMU device 618, which has a 1000 Hz sampling rate, with a reporting rate of 500 Hz. It will be understood by those skilled in the art that different sampling and reporting rates may be used in other embodiments of the invention, provided that positional tracking of hard hat 600 is sufficiently rapid to achieve a smooth augmented reality display.

Thus, in step 653, the position and orientation of the hard hat 600 on the construction site 1 is tracked by processing IMU data received from the IMU device 618, and updated tracking data is output as indicated by reference 654, as described above.

It is known in the art that IMU's drift owing to double-integration of error. The drift is of the order of metres per second. In the hard hat 600 of the present example, the error in the tracking data generated by the IMU device 618 is periodically squelched using more accurate position and orientation information derived from the timing data output by the FPGA 607.

As described above, the beams 104, 105 from each base station 102 of the present embodiment sweep across the construction site 1 at a frequency of 60 Hz. In step 655, the processor 608 polls the FGPA 607 for updated timing data. It will be appreciated that updated timing data is available 60 times per second, and is processed in step 656 to determine the position and orientation of the hard hat 600 relative to the base stations 102, as described above. As indicated by reference numeral 657, corrected tracking data is output from the hard hat to the glasses 700. In this way, the tracking data generated by the IMU device 618 is fused with tracking data derived from the timing data output by the FGPA 607.

The storage device 711 of the glasses 700 contains computer-executable machine code that can be processed by the processor 708 for controlling the operation of the glasses 700. As mentioned above, those skilled in the art will be familiar with numerous computer programming languages that may be employed for writing software which can be compiled to generate the machine code, which causes the glasses 700 to operate in accordance with the flowchart of FIG. 15.

In addition, the storage device 711 stores a mathematical transformation for transforming the location and orientation of the hard hat 600 in the tracked volume 110 defined by the base stations 102, which are defined in the intrinsic coordinate system of the tracking system 100, into an extrinsic, real-world coordinate system. The transformation may be obtained in accordance with the invention using any of the methods and/or apparatus described above in relation to FIG. 4, 5A or 5B and/or FIG. 6 or 10. The transformation may be inputted into the glasses 700 via the I/O device 712, or wirelessly through the Wi-Fi microcontroller 716, and stored in the storage device 711.

The storage device 711 also stores model data representing a building information model such, for example, as the BIM model described above with reference to FIG. 7. As mentioned above, the BIM model is defined in the extrinsic real-world coordinates. As with the transformation, the BIM model data may be inputted to the glasses 700 through the I/O device 712 or wirelessly through the Wi-Fi microcontroller 716. Suitably, the BIM model data may be downloaded from a remote server via the Internet.

The storage device 711 also stores display data representing various physical and/or optical properties of the augmented reality glasses 700, including the focal distance at which images displayed by the displays 725a, 725b are positioned in front of the user.

Figure 15:
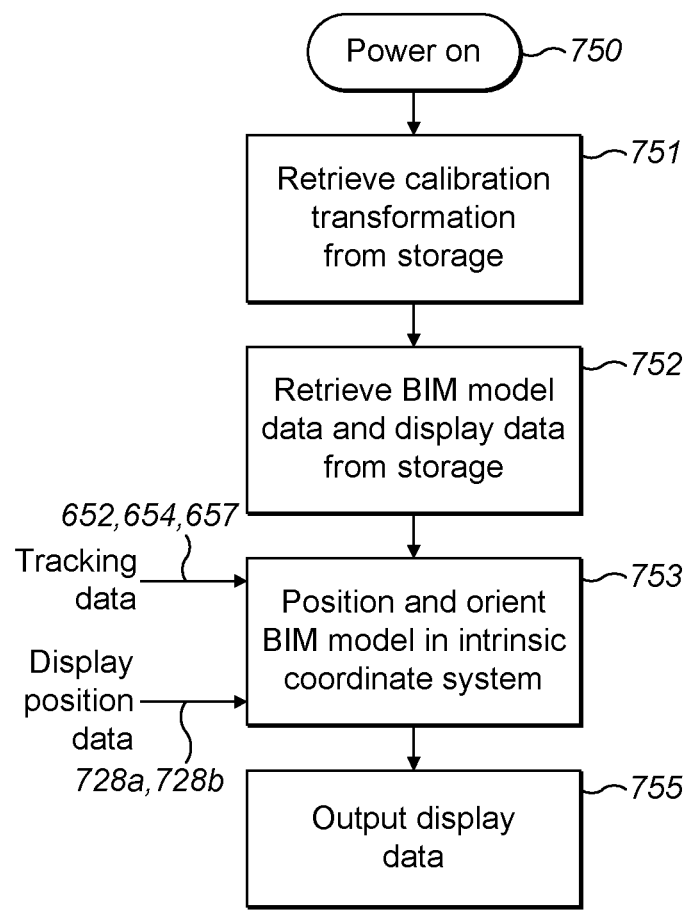
FIG. 15 is a flowchart representing operation of the augmented reality display module of the hard hat of FIGS. 12 and 13.

Upon powering on the glasses 700 in step 750 of FIG. 15, the processor 708 accesses the storage device 711 to load the machine code into the memory device 710 for processing by the processor 708. In steps 751 and 752 respectively, the processor 708 executes the machine code to retrieve the transformation, BIM model data and display data from the storage device 711 and load them into the memory unit 710.

Figure 16:
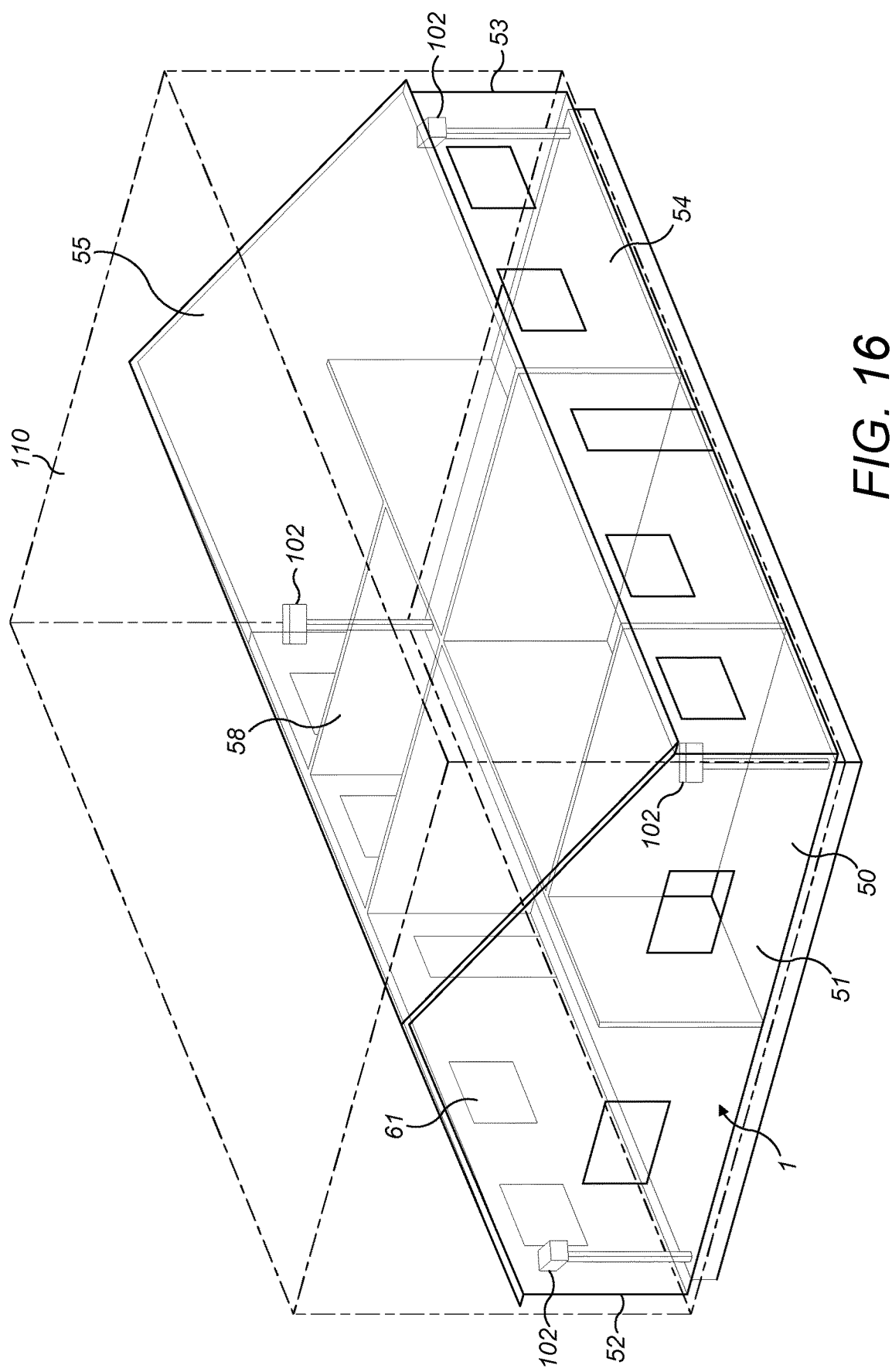
FIG. 16 represents schematically the BIM model of FIG. 7 correctly positioned and oriented with respect to the construction site of FIG. 1.

The machine code comprises a model positioning module that is executable by the processor 708 for converting the coordinates of the BIM model, which are defined in the extrinsic coordinate system, to the intrinsic coordinate system utilised by the tracking system 100 using the mathematical transformation retrieved from the storage device 711. In step 753, therefore, the model data are processed using the transformation to position and orient the BIM model correctly and to scale in the intrinsic coordinate system, as represented schematically in FIG. 16.

The machine code further comprises an image rendering module that is executable by the processor 708 for rendering a stereoscopic virtual 3-D image of the building information model for display in the transparent display devices 725a, 725b in context, superposed on a direct view of the construction site 1, as viewed through the goggles 620 and transparent plate 720 of the hard hat and glasses. The virtual 3-D image of the BIM model is rendered based on the converted model data, the display data, the tracking data 652, 654, 657 received from the hard hat 600 and display position data received from the eye-tracking devices 728a, 728b for displaying the image of the model in the correct context relative to the position of the hard hat 600 on the construction site 1 and relative to the position of the hard hat 600 relative to the user's head, more particularly the augmented reality glasses 700 relative to the user's eyes.

The virtual 3-D image of the BIM model may be rendered using rasterization, ray tracing or path tracing, as known to those skilled in the art, and is output to the transparent displays 725a, 725b in step 755, with a frame rate of at least 30 Hz, preferably 60 Hz. In the present example, the synthetic image of the BIM model is refreshed of the frame rate of 90 Hz. It will be understood that at a frame rate of 90 Hz, tracking data based on the output from the IMU 618 must be used which has a report rate, as mentioned above, of 500 Hz, but this is corrected at a frequency of 60 Hz using the timing data from the sensors 602a, 602b, 602c . . . 602n on the helmet 601. In embodiments in which a faster scan rate of the beams 104, 105 is used, it may be possible to dispense with the IMU 618 and base the tracking data wholly on the timing data received from the sensors.

Figure 17:
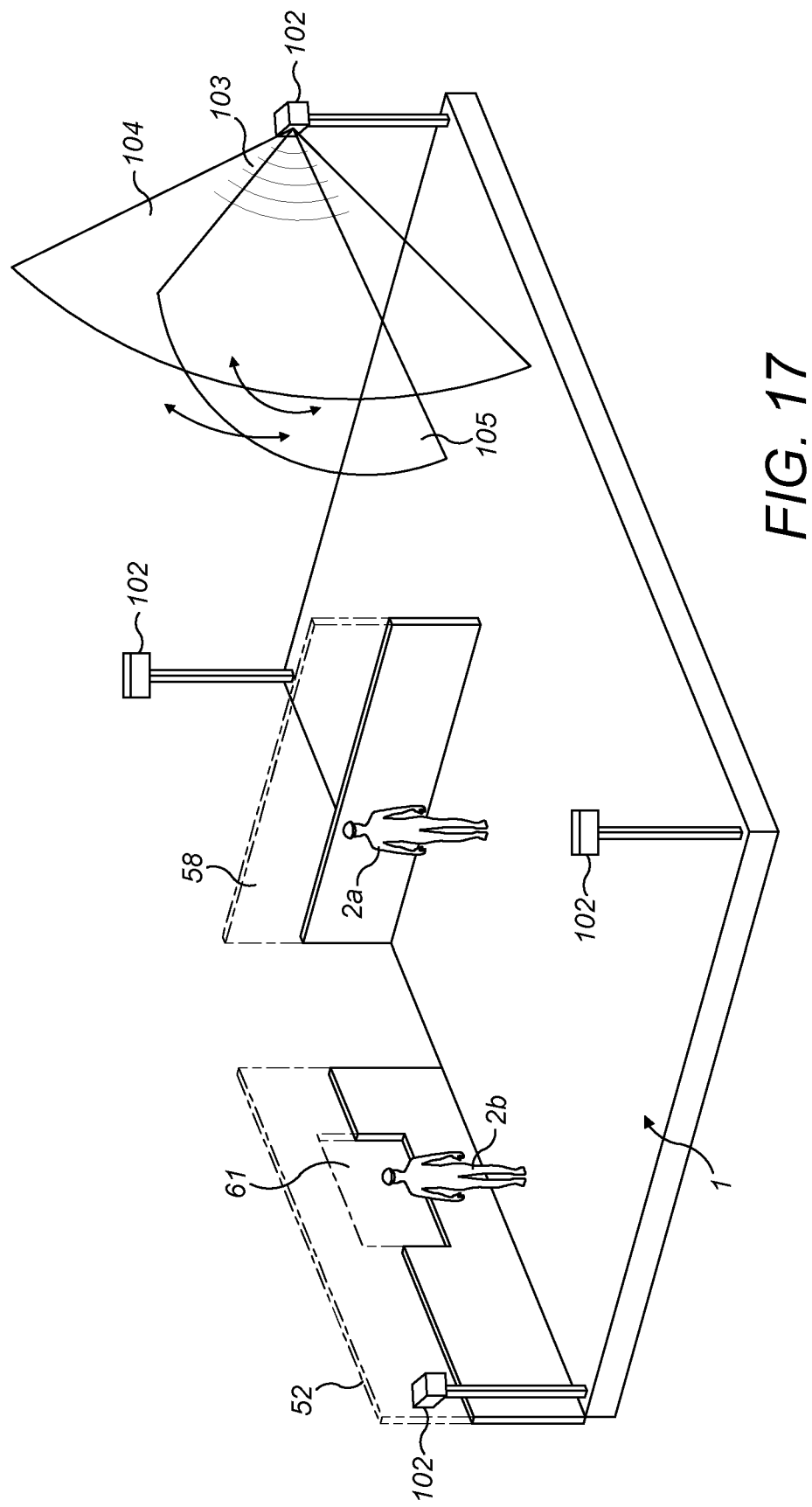
FIG. 17 illustrates schematically a method of setting-out a construction site in accordance with the present invention using the hard hat with augmented reality glasses of FIGS. 12 and 13.

As illustrated in FIG. 17, only a selected part of the BIM model may be displayed to a user 2a, 2b. By way of illustration, the user 2a indicated in FIG. 17 is shown the internal partition 58 of the building 50 represented by the building information model that is to be constructed at the construction site 1. Advantageously, using the methods and apparatus of the present invention, a virtual 3-D image of the partition 58 is shown to the user in the correct position and orientation, and to the correct scale, at the construction site 1. Similarly, the user 2b in FIG. 17 is shown the wall 52 and window 61 to be constructed at the construction site 1.

In this way, the hard hat 600 and augmented reality glasses 700 of the present invention allow a construction site 1 to be set out without physically marking reference points that are located using a total station. Instead, the construction site 1 can be set out by displaying to a user a task to be carried out at the construction site 1 in context, in the correct location and orientation. In the present embodiment, the task to be carried out is the construction of the building 50 shown in FIG. 7, with individual sub-tasks including constructing the wall 52 with the window 61, and constructing the internal partition 58. However, in other embodiments, any task to be carried out that can be illustrated graphically may be displayed in virtual form in the augmented reality glasses 700. For instance, other tasks that may be displayed in virtual form in the glasses 700 include where a trench is to be dug, a pipe to be laid or cut, one or more holes to be made an object, for example to provide access to cables or pipes, and the like.

It will be appreciated that the methods of the present invention are not limited to a single user. In some embodiments, a plurality of members of a work crew at a construction site such, for example, as the construction site 1, may be equipped with hard hats 600 and augmented reality glasses 700 as described above. The glasses 700 for each user are calibrated using the same mathematical transformation, and each user will be shown an individual virtual image of part of the building information model based on their respective position on the construction site 1 as determined using the tracking system 100 with the sensors 602a, 602b, 602c . . . 602n in their respective hard hats 600.

In embodiments in which the transformation is continually updated as described above with reference to FIG. 5B, the transformation can be broadcast simultaneously to all users for example using the Wi-Fi microcontrollers in each set of glasses 700.

As described above, the position of the hard hat 600 is derived from the positions of the sensors 602a, 602b, 602c . . . 602n relative to the base stations 102 set up at the construction site 1. Since the virtual image of the BIM model is displayed in the transparent displays 725a, 725b of the glasses 700, some correction must be made to account for the displacement of the displays 725a, 725b relative to the hard hat. This is facilitated if the glasses 700 are fixedly secured to the hard hat 600 as described above. However, in some embodiments, the machine code for the glasses 700 may include an alignment module for ensuring that the glasses 700 are correctly positioned relative to the hard hat 600. For this purpose, a method of alignment as disclosed by US 2017/0090203 A1, the contents of which are incorporated herein by reference, may be used. Other suitable methods of alignment will be apparent to those skilled in the art.

In a similar way, an adjustment may be needed to account for any visual artefacts created by the transparent plate 720 or displays 725a, 725b. For instance, if the transparent plate 720 is shaped such that the eye regions 723a, 723b verge, or include a lens for correcting the direct image of the construction site 1 as seen through the transparent plate 720, some correction may be needed for this based on the display data when rendering the synthetic image of the BIM model in the displays 725a, 725b.

As described above, it is important in accordance with the present invention to track the position of the augmented reality glasses 700 relative to the user's head to ensure that the position of the virtual camera (indicated at reference numeral 1910 in FIGS. 19 and 20), and thus also of the virtual image that is displayed to the user on the displays 725a, 725b, is suitably adjusted to account for any movement of the hard hat 600 on the user's head. This is illustrated schematically in FIGS. 18-20.

Figure 18:
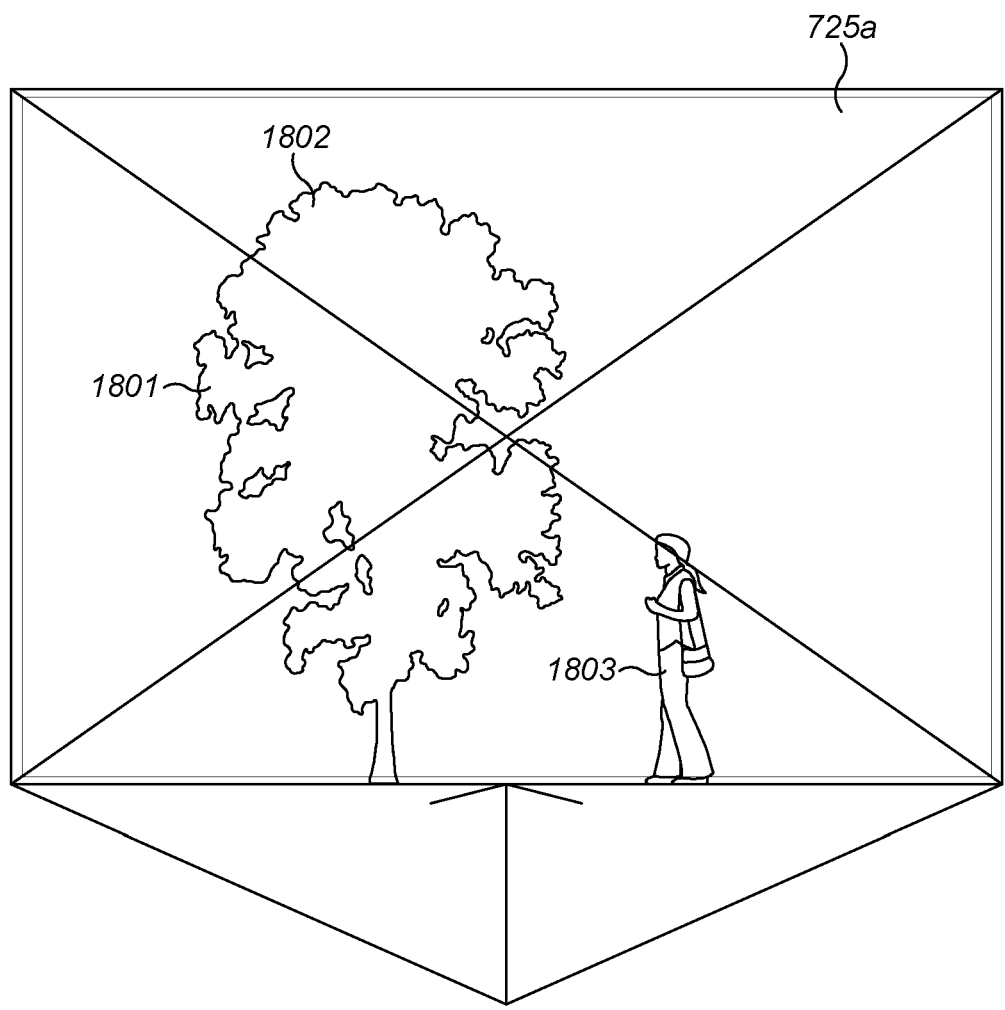
FIG. 18 shows a user's view of a virtual image on a display when the display is centred in relation to the user's eyes. The virtual image is located correctly in relation to the user's view of the real world through the display.

FIG. 18 shows a virtual image 1801 that is displayed on one of the displays 725a by way of example. Purely for the purposes of illustration, the virtual image 1801 comprises a tree 1802 and a person 1803. In FIG. 18, the display 725a is correctly centred with respect to the user's eye, such that the virtual image 1801 appears in its correct place relative to the real world with which it is overlaid by the augmented reality glasses 700. It will be understood that in the context of the present invention, it is important for the BIM model to be displayed in its correct location and orientation relative to the construction site 1 to indicate accurately to the user where certain construction tasks are to be carried out.

Figure 19:
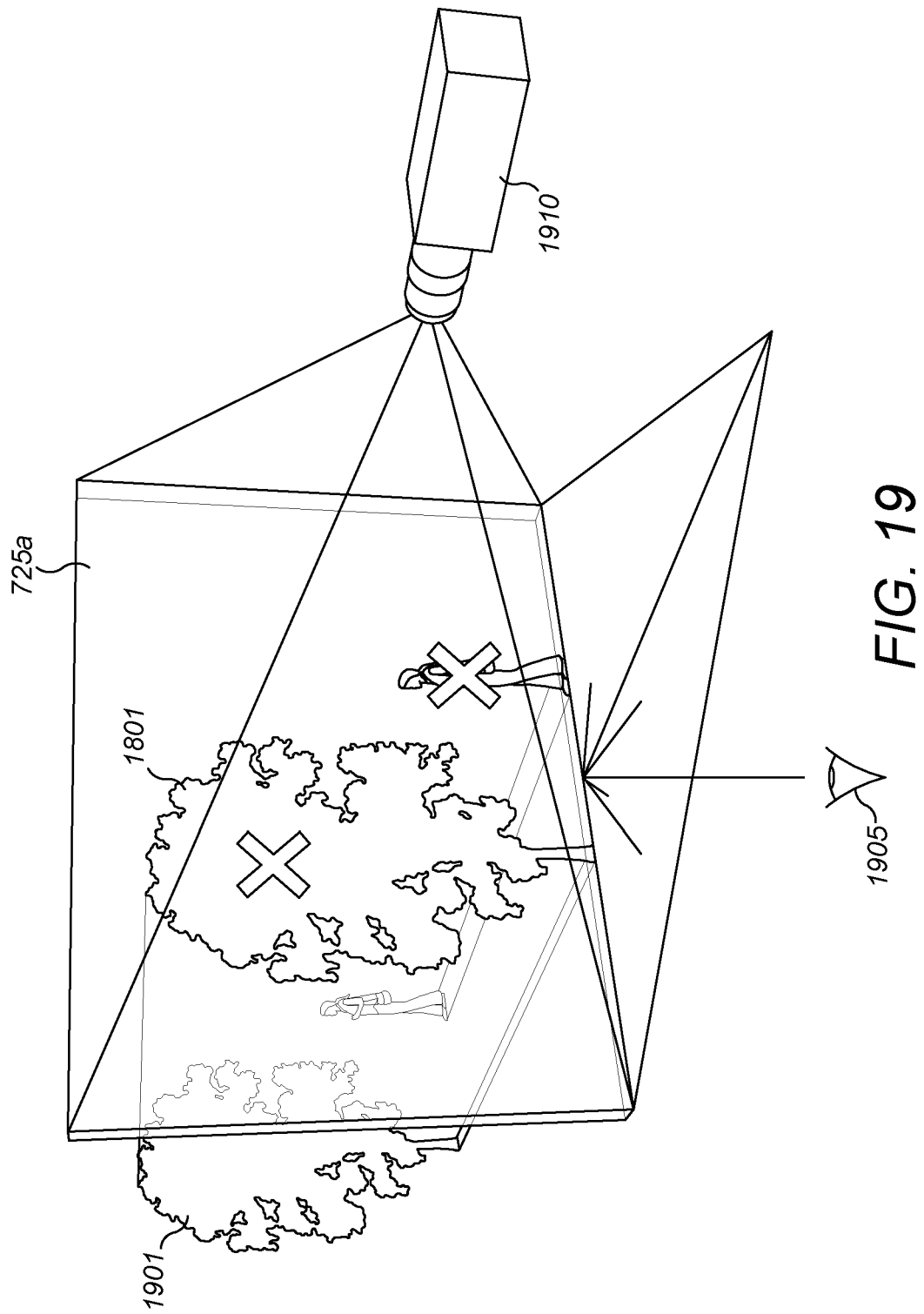
FIG. 19 shows a user's view of the same virtual image as FIG. 18 with the display displaced from the centre position. The virtual image is located incorrectly in relation to the user's view of the real world through the display.

It will be appreciated that in use, the hard hat 600 is liable to move relative to the user's head. This may be a result of physical movement of the user, for example in carrying out physical activities such as construction tasks. For instance, the user may be subject to impulses or vibrations that are transmitted through his or her body by dint of the various construction tasks that he or she is carrying out, which may result in slippage of the hard hat 600 relative to the user's head. As illustrated in FIG. 19, movement of the display 725a relative to the user's eye 1905 without corresponding adjustment of the virtual image as described below will result in displacement of the virtual camera 1910 such that the virtual camera 1910 is no longer aligned with the user's eye 1905, with the result that the virtual image 1801 is displayed in the incorrect location relative to the real world which the user can see through the display 725a. In FIG. 19, reference numeral 1801 indicates the position of the virtual image as displayed incorrectly to the user by virtue of movement of the hard hat 600 relative to the user's head, while reference numeral 1901 indicates the correct location of the virtual image relative to the real world.

Figure 20:
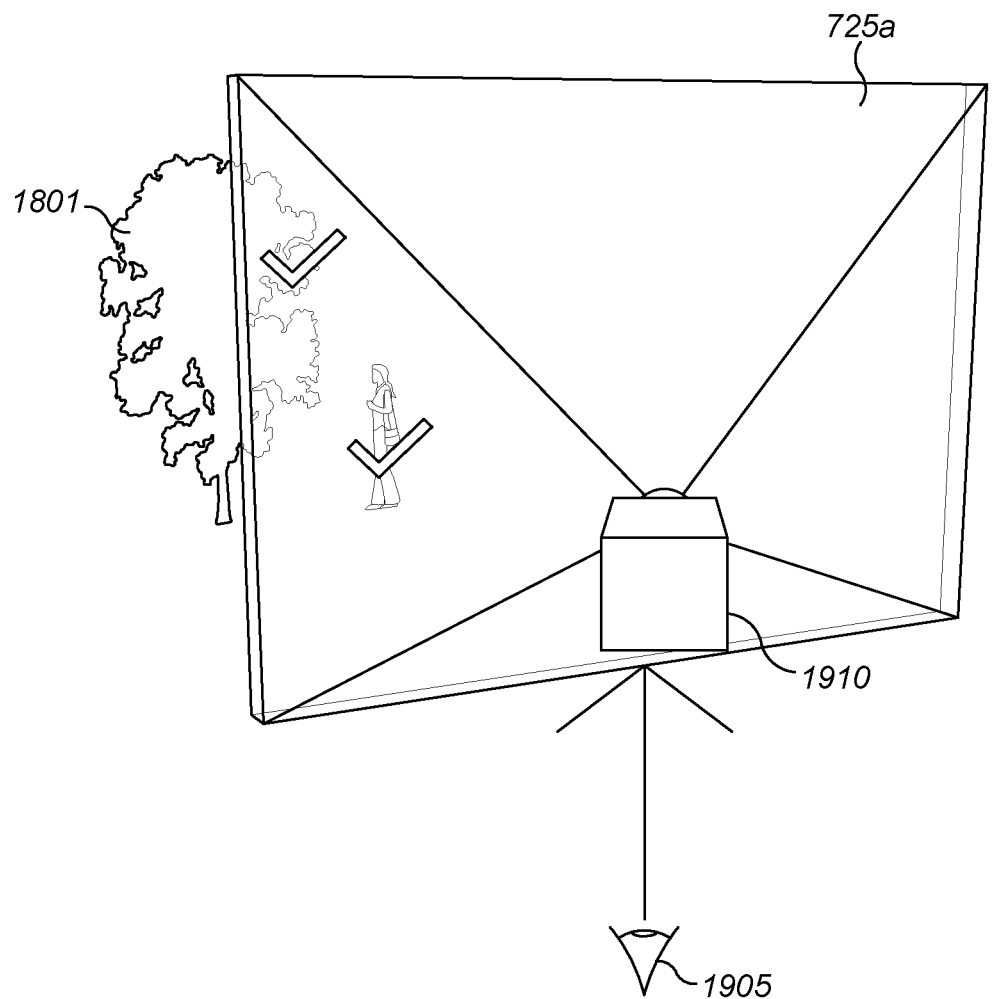
FIG. 20 illustrates schematically how the position of the virtual image of FIG. 18 should be adjusted on the display to compensate for displacement of the display from the centre position, such that the image remains correctly located relative to the user's view of the real world through the display.

In order to compensate for movement of the hard hat 600 relative to the user's head in use, the position of the hard hat 600 relative to the user's head is monitored using the eye-tracking devices 728a, 728b. The eye-tracking devices 728a, 728b generate display position data as described above which is indicative of the position of the hard hat 600 relative to the user's head, more particularly the augmented reality glasses 700 relative to the user's eyes 1905. This display position data is processed by the processor 708 with the display data and tracking data 652, 654, 657 to render a virtual image of the BIM model in its correct location relative to the construction site as shown in FIG. 20, effectively by keeping the virtual camera 1910 in alignment with the user's eye 1905.

Figure 21:
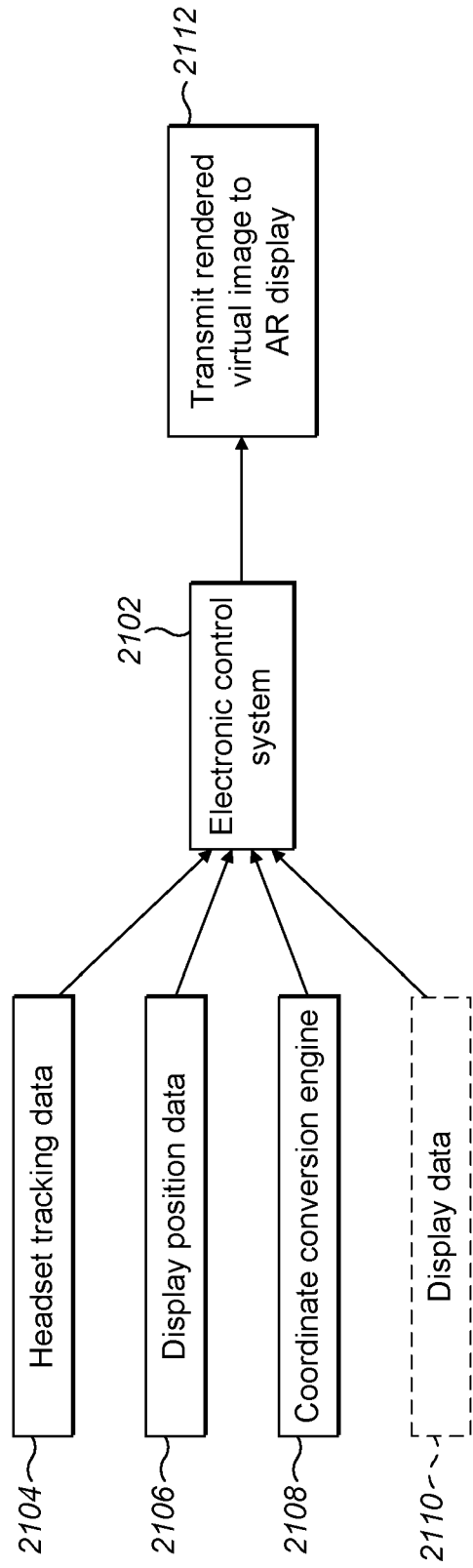
FIG. 21 is a flowchart which illustrates operation of an electronic control system for an augmented reality headset according to the present invention in which a virtual image is rendered on the basis of data representing the image, headset tracking data, eye-tracking data, coordinate conversion data and the properties of the display.

This process is presented schematically in FIG. 21 which illustrates processing by an electronic control system 2102 according to the present invention to fuse headset tracking data 2104 from the hard hat 600 in the intrinsic coordinate system, display position data 2106 generated by the eye-tracking devices 728a, 728b and display data 2110 representing the physical/optical properties of the augmented reality glasses 700 to produce a virtual image of the BIM model, which is defined in the intrinsic coordinate system by dint of a coordinate conversion engine 2108, for display by the augmented reality glasses 700. In this way, the present embodiment of the invention aims to display the virtual image of the BIM model relative to the construction site 1 to an accuracy of about 3 mm or better while maintaining the virtual camera that is intrinsic to the augmented reality display system in proper alignment with the user's eyes to avoid parallax between the real world and the virtual image.

It will be appreciated by one skilled in the art that the headset of the present invention seeks to display, for example to mm accuracy, a virtual image of a BIM model to a worker at a construction site representing a construction task to be carried out. The virtual image can be displayed in its correct position and orientation on the construction site as defined by the BIM model, in a context relative to the worker. By virtue of the transformation of coordinates between an intrinsic, tracked coordinate system of the positional tracking system and an extrinsic real-world coordinate system, the BIM model can be displayed to the worker in its proper context. By using eye-tracking or other methods for detecting the position of an augmented reality display relative to the user's head according to embodiments, small movements or changes in orientation of the display owing to physical activities such as manual labour carried out by on-site workers may be accounted for and the virtual model may remain in its correct location as defined by the BIM model.

The invention claimed is:

1. A method comprising:
    tracking a portable construction tool at a construction site using a positional tracking system to locate the tool in an intrinsic coordinate system defined by the positional tracking system, including:
        obtaining coordinates of one or more control points at or near the construction site in an extrinsic, real world coordinate system; and
        locating, with the positional tracking system, each of said one or more control points in the intrinsic coordinate system;
    relating coordinates of the located control points in the intrinsic coordinate system to the corresponding obtained coordinates in the extrinsic, real-world coordinate system, including using the related coordinates to derive a transformation between the real world coordinate system and the intrinsic coordinate system;
    tracking the tool at the construction site using the positional tracking system to locate the tool in the intrinsic coordinate system defined by the positional tracking system; and
    using the derived transformation to translate the location of the tool between the intrinsic coordinate system and the extrinsic, real-world coordinate system.

2. The method as claimed in claim 1, wherein the derived transformation is used to indicate a location within the extrinsic, real-world coordinate system.

3. The method as claimed in claim 2, wherein the positional tracking system is an optical inside-out positional tracking system.

4. The method as claimed in claim 1, wherein the extrinsic, real world coordinate system is a geographic coordinate system and wherein obtaining coordinates of one or more control points at or near the construction site in an extrinsic, real world coordinate system comprises determining the location of each control point using a total station and triangulating from two or more points of known geographic location at or adjacent the construction site.

5. The method as claimed in claim 1, wherein the positional tracking system comprises at least one source of electromagnetic radiation or acoustic waves that is stationary at the construction site and the at least one sensor on the tool is arranged for detecting or measuring a property of the electromagnetic radiation or acoustic waves that is indicative of an angular distance from the sensor to the stationary source.

6. The method as claimed in claim 1, wherein the method comprises, tracking the position of the tool for locating where specific operations are to be carried out or reference points at the construction site.

7. The method as claimed in claim 1, further comprising calculating the location of the tool in the extrinsic, real-world coordinate system using the transformation and indicating the position of the tool in real-world coordinates of the construction site using a user interface.

8. The method as claimed in claim 1,
    wherein the tool further comprises a headset including augmented reality glasses that are wearable by a user and include at least one display for displaying information relating to the position of the tool on the construction site in the extrinsic, real-world coordinates.

9. The method as claimed in claim 8, wherein the augmented reality glasses are operable to display a virtual image of a three-dimensional building information model (BIM) that is defined in the extrinsic real-world coordinates, wherein the virtual image is correctly located, oriented and scaled relative to the construction site and is displayed to the user in a correct context for the user's position on the site by using the transformation to convert between the real-world site coordinates of the building model and the intrinsic coordinate system, wherein the user views the construction site through the augmented reality glasses and the virtual image provides an augmented reality view of the construction site.

10. The method as claimed in claim 8, wherein a plurality of users uses a respective plurality of headsets at the construction site and wherein the transformation is continually updated and broadcast simultaneously and wirelessly to the plurality of headsets.

11. The method as claimed in claim 1, wherein the tool comprises using at least one inertial measurement unit and tracking the tool comprises:
    additionally tracking the position and orientation of the tool using the at least one inertial measurement unit; and
    fusing additional tracking data from the at least one inertial measurement unit with tracking data from the positional tracking system to provide tracking data at a frequency higher than that of the positional tracking system.

12. Equipment for use on a construction site, comprising:
    at least one portable construction tool;
    a positional tracking system configured to locate the tool in an intrinsic coordinate system used by the positional tracking system, wherein the at least one tool comprises at least one sensor for the positional tracking system; and
    an electronic control system configured to:
        generate a transformation for converting between the intrinsic coordinate system and an extrinsic, real-world coordinate system by using the positional tracking system to locate the positions in the intrinsic coordinate system of one or more control points of known location in the real-world coordinate system, the electronic control system having access to the coordinates of the one or more control points in both the intrinsic coordinate system and the extrinsic, real-world coordinate system and relating said coordinates to derive the transformation; and convert between the coordinates of the tool in the intrinsic coordinate system, as defined by the positional tracking system, and corresponding coordinates in the extrinsic, real-world coordinate system based on the transformation.

13. Equipment as claimed in claim 12, wherein the tool comprises a user interface for indicating the position of the tool in the extrinsic, real-world coordinate system to a user.

14. Equipment as claimed in claim 12, wherein the positional tracking system is an optical inside-out positional tracking system.

15. Equipment as claimed in claim 14, wherein:
the positional tracking system is configured to locate the tool within a tracked volume;
the at least one tool comprises a plurality of sensors where the relative positions of the sensors on the at least one tool are known; and
each of the plurality of sensors is configured to detect electro-magnetic radiation.

16. Equipment as claimed in claim 12, wherein the positional tracking system comprises at least one sensor which is attached to the tool, wherein the at least one sensor is configured to detect electromagnetic radiation or acoustic waves that are received from at least one source of electromagnetic radiation or acoustic waves that is stationary at the construction site, the positional tracking system being operable to detect or measure a property of the electromagnetic radiation or acoustic waves that is indicative of angular distance from the at least one sensor to the at least one source.

17. Equipment as claimed in claim 12, wherein the tool comprises a multiple sensor calibration tool, the multiple sensor calibration tool comprising:
a body;
a handle portion; and
a plurality of sensors for the positional tracking system, wherein the multiple sensor calibration tool is configured to be coupled to a control point within the construction site for operation of the calibration engine.

18. Equipment as claimed in claim 12, wherein the tool comprises a headset that incorporates an augmented reality display for displaying information related to the position of the tool on the construction site or a peripheral device associated with the headset on the construction site in the extrinsic, real-world coordinates.

19. Equipment as claimed in claim 18, wherein the augmented reality display comprises augmented reality glasses that are operable to display a virtual image of a three-dimensional building information model (BIM) that is defined in the extrinsic real-world coordinates, wherein the virtual image is correctly located, oriented and scaled relative to the construction site and is displayed to the user in a correct context for the user's position on the site by using the transformation to convert between the real-world site coordinates of the building model and the intrinsic coordinate system, wherein the user views the construction site through the augmented reality glasses and the virtual image provides an augmented reality view of the construction site.

20. Equipment as claimed in claim 18, wherein the tool further comprises at least one inertial measurement unit and the electronic control system is configured to additionally track the position and orientation of the tool using the at least one inertial measurement unit and fuse additional tracking data from the at least one inertial measurement unit with tracking data from the positional tracking system to provide tracking data at a frequency higher than that of the positional tracking system.

21. Equipment as claimed in claim 18, comprising:
a plurality of headsets to be worn by a plurality of different users at the construction site, each headset comprising a wireless communication module, wherein the transformation is continually updated and broadcast simultaneously and wirelessly to the headsets of the plurality of users.

22. A headset for use at a construction site, the headset being communicatively coupled to one or more position-tracking sensors, the headset comprising an augmented reality display for displaying a virtual image of a building information model (BIM) when viewed by a user and an electronic control system, the electronic control system configured to:
receive and process model data representing the building information model;
use a transformation between the extrinsic coordinate system and an intrinsic coordinate system;
receive tracking data representing the position and orientation of the headset in the intrinsic coordinate system;
render a virtual image of the model relative to the position and orientation of the headset; and
transmit the image to the augmented reality display where it is viewable by a user as a virtual image of the model,
wherein the tracking data is derived from sensor data representing the responses of the position-tracking sensors to electromagnetic radiation; and
the transformation is derived by relating the coordinates of one or more control points of known location in the extrinsic coordinate system to their corresponding coordinates in the intrinsic coordinate system, the coordinates of the one or more control points in the intrinsic coordinate system being derived from sensor data representing the responses of the one or more position tracking sensors.

23. A non-transitory computer readable medium storing instructions for controlling equipment for use on a construction site that, when executed by one or more processors, cause the one or more processors to:
determine a position and/or orientation of a portable construction tool in an intrinsic coordinate system; and
convert the coordinates of the tool in the intrinsic coordinate system to corresponding coordinates in an extrinsic, real-world coordinate system using a transformation for converting between the intrinsic and extrinsic coordinate systems.

24. The non-transitory computer readable medium of claim 23, wherein the transformation is derived by relating the positions of one or more control points of known location in the real-world coordinate system to their corresponding positions in the intrinsic coordinate system as determined using an inside-out positional tracking system.

25. The non-transitory computer readable medium of claim 23, wherein the instructions further cause the one or more processors to:
control a display to display the position of the tool in the extrinsic, real-world coordinates.

26. The non-transitory computer readable medium of claim 23, wherein the instructions further cause the one or more processors to:
convert a position and orientation of a building information model (BIM), which is defined in the extrinsic, real-world coordinate system, as represented by model data between the extrinsic coordinate system and the intrinsic coordinate system using the transformation.

27. The non-transitory computer readable medium of claim 26, wherein the instructions further cause the one or more processors to:
render a virtual image of the building information model for display in an augmented reality display forming part of the tool using the converted model data and the position and orientation of the tool, as represented by the tracking data.

28. A positional tracking system at a construction site comprising:
one or more portable construction tools; and
a base station to emit at least one beam of electromagnetic radiation for measurement of a position of at least one of said one or more portable construction tools,
wherein at least one of the one or more portable construction tools comprise:
an augmented reality headset comprising:
an augmented reality display for displaying a virtual image of a building information model (BIM) when viewed by a user, and
an electronic control system,
wherein the positional tracking system comprises one or more optical sensors to enable a position in three-dimensions of at least one part of at least one of the portable construction tools to be determined, the one or more optical sensors receiving electromagnetic signals emitted by the base station to determine said position,
wherein the augmented reality headset uses the base station of the positional tracking system to determine a position of said headset at the construction site, and
wherein the electronic control system of the augmented reality headset is configured to use measured positions of at least one of the portable construction tools, including a position of the augmented reality headset as determined using the base station of the positional tracking system, to display the virtual image of a building information model (BIM).

29. The positional tracking system of claim 28, wherein the base station comprises an opto-mechanical arrangement and is configured to emit directional modulated beams of electromagnetic radiation, and wherein the one or more optical sensors comprise a set of photodiodes to receive said directional modulated beams of electromagnetic radiation emitted from the base station, wherein sensor data derived from the one or more optical sensors has at least one property that is indicative of an angular distance that is used to determine said position of said headset at the construction site in three-dimensions for use in displaying the virtual image of the building information model.

30. The positional tracking system of claim 28, wherein the positional tracking system is calibrated using positions of three or more control points that have a known position as measured using a total station.

31. The positional tracking system of claim 28, wherein the one or more optical sensors are not cameras.

32. A headset for use at a construction site, the headset being communicatively coupled to one or more position-tracking sensors, the headset comprising an augmented reality display for displaying a virtual image of a building information model (BIM) when viewed by a user and an electronic control system, the electronic control system configured to:
receive and process model data representing the building information model;
receive tracking data representing the position and orientation of the headset, the tracking data being derived from sensor data from the one or more position-tracking sensors, the one or more position-tracking sensors being configured to receive beams of electromagnetic radiation from a base station at the construction site, the sensor data having at least one property that is indicative of an angular distance for the determination of the position and orientation of the headset;
render a virtual image of the model relative to the position and orientation of the headset; and
transmit the image to the augmented reality display where it is viewable by a user as a virtual image of the model.

33. A portable construction tool for use in displaying a virtual image of a building information model at a construction site, the portable construction tool comprising:
a body;
a handle portion for holding the portable construction tool;
a mounting portion for mounting the portable construction tool at a location within the construction site; and
a plurality of sensors, the plurality of sensors being arranged to generate sensor data representative of the detection of one or more beams of electromagnetic radiation, the one or more beams being emitted by a base station at the construction site, wherein said sensor data has a property that is indicative of an angular distance, wherein said sensor data is used to derive positions in three-dimensions of at least a part of the portable construction tool during use, and wherein said positions are used to calibrate the display of the virtual image of the building information model with a headset at the construction site, a position and orientation of the headset also being determined based on the detection of one or more beams of electromagnetic radiation emitted by the base station.

* * * * *